(12) United States Patent
Shima

(10) Patent No.: US 12,375,670 B2
(45) Date of Patent: *Jul. 29, 2025

(54) IMAGE ENCODING APPARATUS, IMAGE ENCODING METHOD, IMAGE DECODING APPARATUS, IMAGE DECODING METHOD, AND NON-TRANSITORY COMPUTER-READABLE STORAGE MEDIUM

(71) Applicant: CANON KABUSHIKI KAISHA, Tokyo (JP)

(72) Inventor: Masato Shima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/420,637

(22) Filed: Jan. 23, 2024

(65) Prior Publication Data

US 2024/0163440 A1 May 16, 2024

Related U.S. Application Data

(63) Continuation of application No. 17/347,379, filed on Jun. 14, 2021, now Pat. No. 11,930,178, which is a continuation of application No. PCT/JP2019/044880, filed on Nov. 15, 2019.

(30) Foreign Application Priority Data

Dec. 17, 2018 (JP) .................................. 2018-235909

(51) Int. Cl.
*H04N 19/126* (2014.01)
*H04N 19/176* (2014.01)
*H04N 19/18* (2014.01)
*H04N 19/82* (2014.01)

(52) U.S. Cl.
CPC ......... *H04N 19/126* (2014.11); *H04N 19/176* (2014.11); *H04N 19/18* (2014.11); *H04N 19/82* (2014.11)

(58) Field of Classification Search
CPC .. H04N 19/176; H04N 19/124; H04N 19/122; H04N 19/70; H04N 19/126; H04N 19/14; H04N 19/463; H04N 19/46; H04N 19/157; H04N 19/147; H04N 19/523; H04N 19/42; H04N 19/119; H04N 19/593; H04N 19/61; G06T 9/008
See application file for complete search history.

(56) References Cited

U.S. PATENT DOCUMENTS

2020/0260116 A1* 8/2020 Francois ................ H04N 19/12

FOREIGN PATENT DOCUMENTS

KR 20140109875 A 9/2014

* cited by examiner

*Primary Examiner* — Farhan Mahmud
(74) *Attorney, Agent, or Firm* — Canon U.S.A., Inc. IP Division

(57) ABSTRACT

An image encoding apparatus for encoding an image comprises a generation unit configured to generate, from a first quantization matrix having a size of N×N (N is a positive integer), a second quantization matrix having a size of P×Q (P and Q are positive integers which satisfy P<N<Q, and the size of P×Q indicates a size of P in a horizontal direction and a size of Q in a vertical direction), and a quantization unit configured to quantize transformation coefficients in a sub-block having a size corresponding to the size of P×Q using the second quantization matrix.

6 Claims, 17 Drawing Sheets

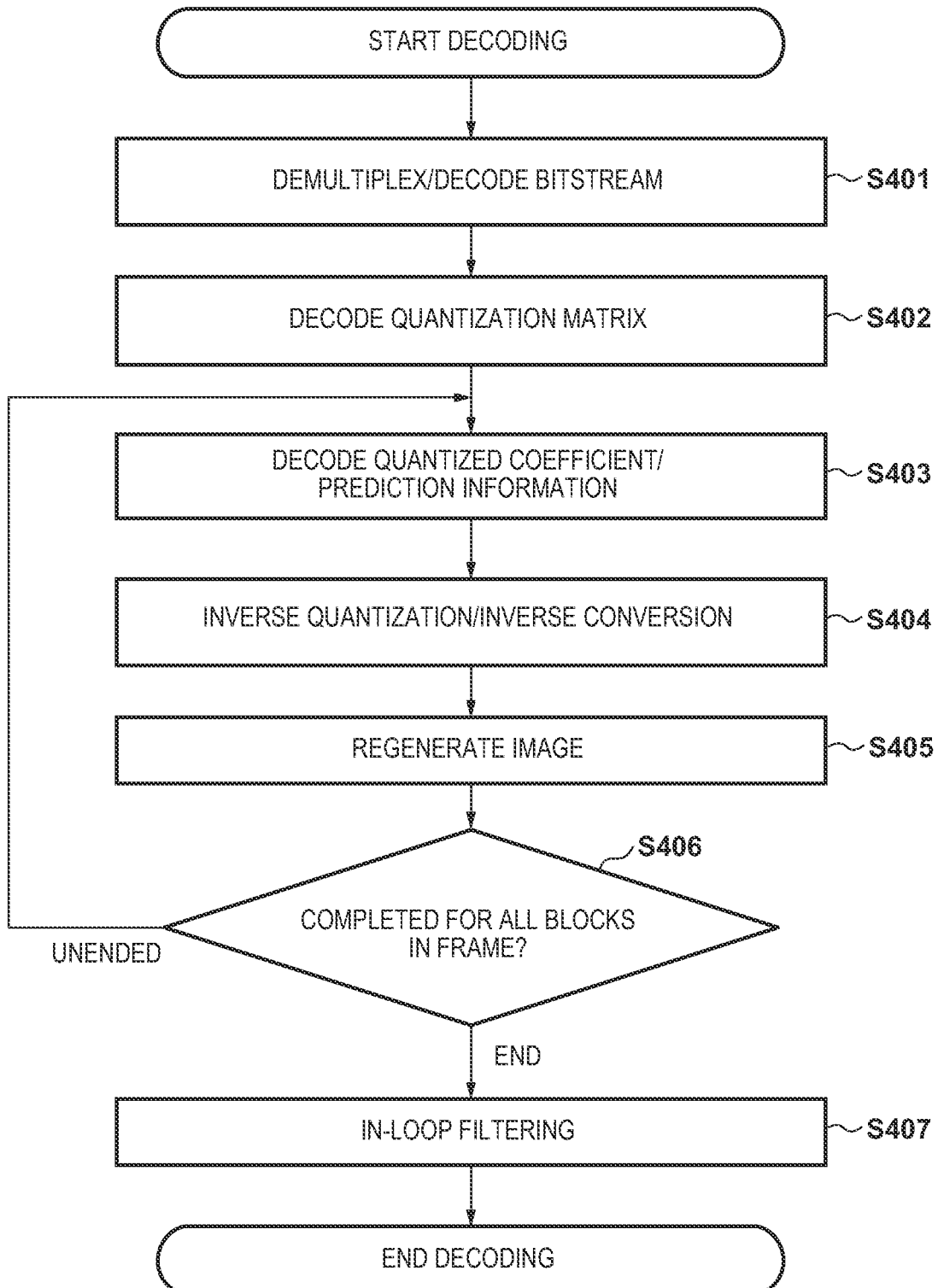

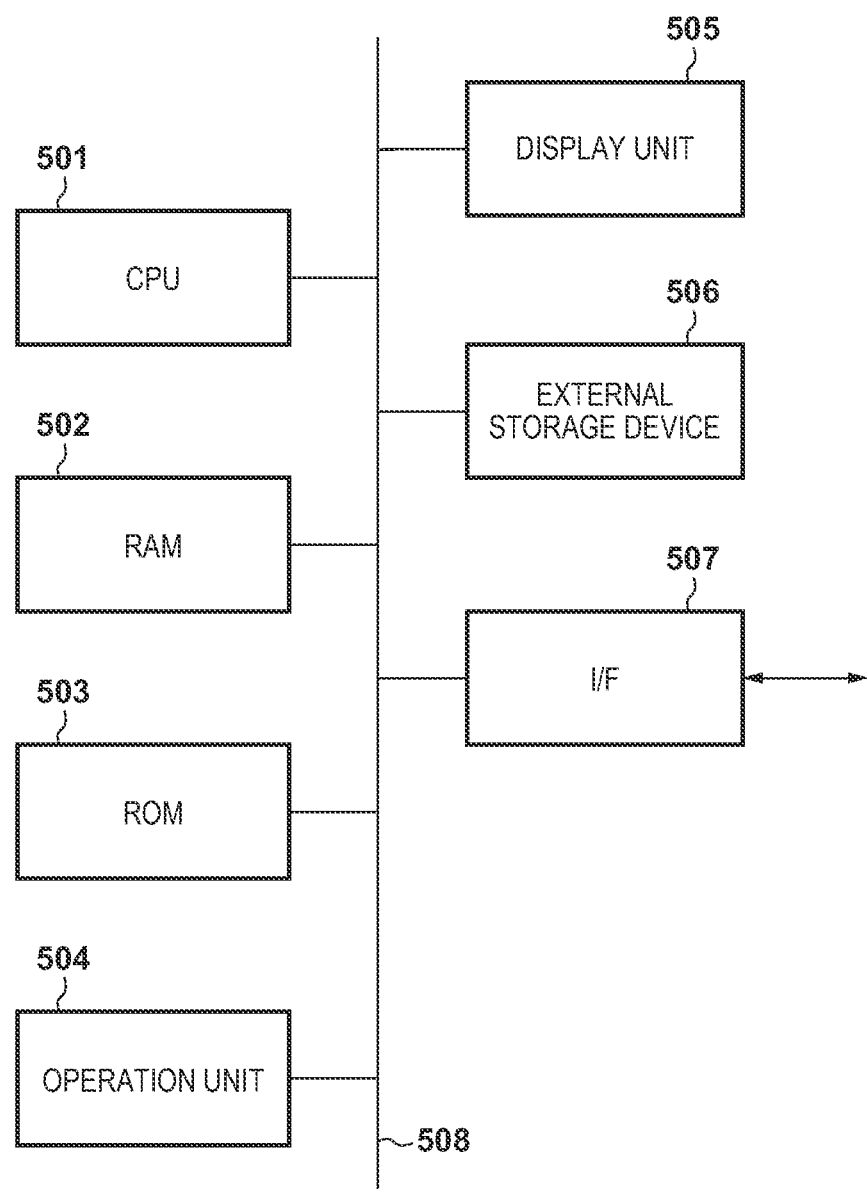

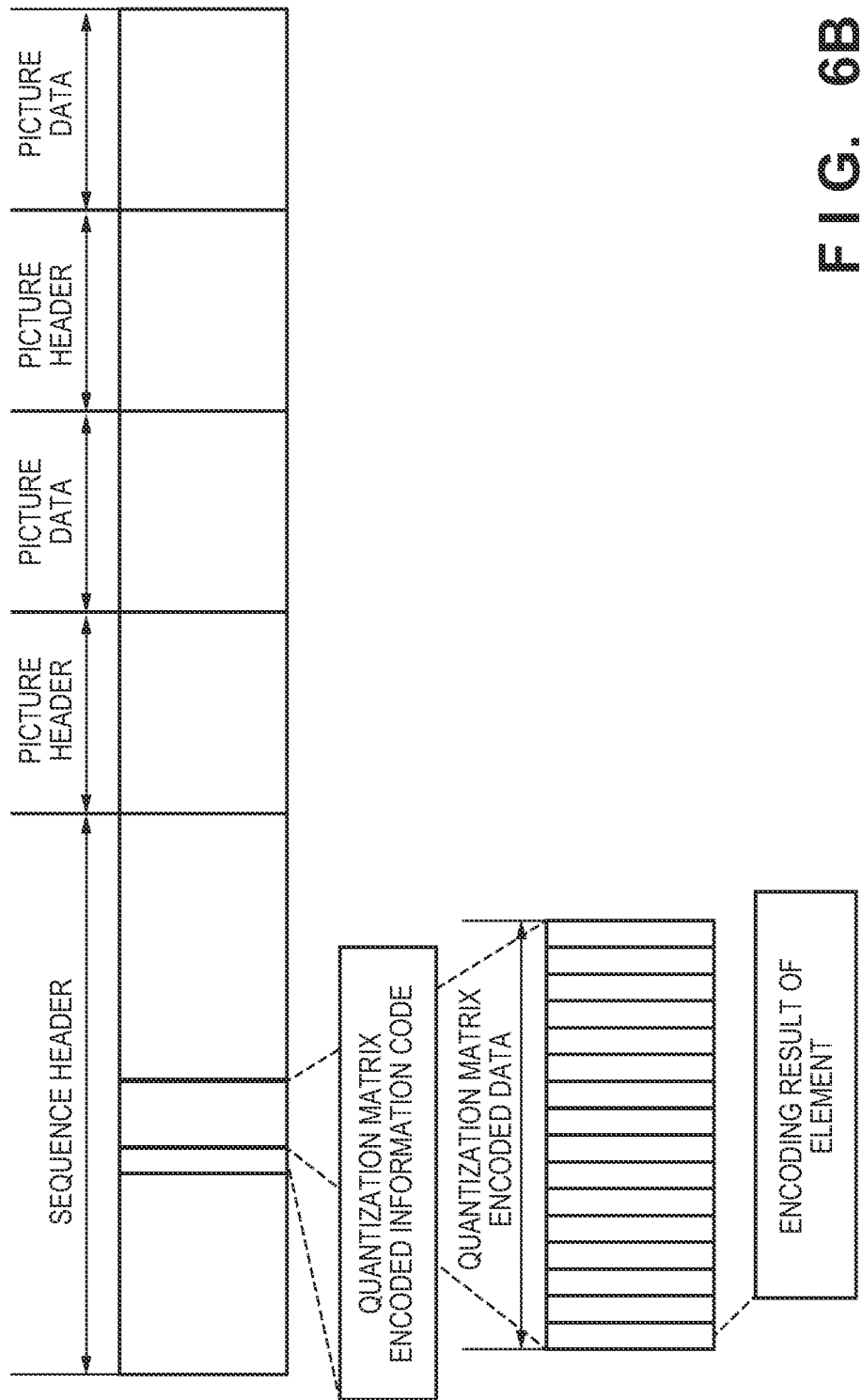

FIG. 8

| | | | | | | | 800 |
|---|---|---|---|---|---|---|---|
| 6 | 9 | 13 | 18 | 25 | 35 | 36 | 37 |
| 9 | 10 | 15 | 21 | 32 | 35 | 37 | 41 |
| 13 | 15 | 18 | 23 | 35 | 55 | 58 | 59 |
| 18 | 21 | 23 | 26 | 65 | 58 | 64 | 66 |
| 25 | 32 | 35 | 65 | 66 | 66 | 67 | 70 |
| 35 | 35 | 55 | 58 | 66 | 68 | 70 | 73 |
| 36 | 37 | 58 | 64 | 67 | 70 | 76 | 80 |
| 37 | 41 | 59 | 66 | 70 | 73 | 80 | 85 |

FIG. 9A

| 6  | 9  | 13 | 18 | 25 | 35 | 36 | 37 |
|----|----|----|----|----|----|----|----|
| 6  | 9  | 13 | 18 | 25 | 35 | 36 | 37 |
| 9  | 10 | 15 | 21 | 32 | 35 | 37 | 41 |
| 9  | 10 | 15 | 21 | 32 | 35 | 37 | 41 |
| 13 | 15 | 18 | 23 | 35 | 55 | 58 | 59 |
| 13 | 15 | 18 | 23 | 35 | 55 | 58 | 59 |
| 18 | 21 | 23 | 26 | 65 | 58 | 64 | 66 |
| 18 | 21 | 23 | 26 | 65 | 58 | 64 | 66 |
| 25 | 32 | 35 | 65 | 66 | 66 | 67 | 70 |
| 25 | 32 | 35 | 65 | 66 | 66 | 67 | 70 |
| 35 | 35 | 55 | 58 | 66 | 68 | 70 | 73 |
| 35 | 35 | 55 | 58 | 66 | 68 | 70 | 73 |
| 36 | 37 | 58 | 64 | 67 | 70 | 76 | 80 |
| 36 | 37 | 58 | 64 | 67 | 70 | 76 | 80 |
| 37 | 41 | 59 | 66 | 70 | 73 | 80 | 85 |
| 37 | 41 | 59 | 66 | 70 | 73 | 80 | 85 |

| 6  | 13 | 25 | 36 |
|----|----|----|----|
| 6  | 13 | 25 | 36 |
| 9  | 15 | 32 | 37 |
| 9  | 15 | 32 | 37 |
| 13 | 18 | 35 | 58 |
| 13 | 18 | 35 | 58 |
| 18 | 23 | 65 | 64 |
| 18 | 23 | 65 | 64 |
| 25 | 35 | 66 | 67 |
| 25 | 35 | 66 | 67 |
| 35 | 55 | 66 | 70 |
| 35 | 55 | 66 | 70 |
| 36 | 58 | 67 | 76 |
| 36 | 58 | 67 | 76 |
| 37 | 59 | 70 | 80 |
| 37 | 59 | 70 | 80 |

| 6  | 6  | 9  | 9  | 13 | 13 | 18 | 18 | 25 | 25 | 35 | 35 | 36 | 36 | 37 | 37 |
|----|----|----|----|----|----|----|----|----|----|----|----|----|----|----|----|
| 9  | 9  | 10 | 10 | 15 | 15 | 21 | 21 | 32 | 32 | 35 | 35 | 37 | 37 | 41 | 41 |
| 13 | 13 | 15 | 15 | 18 | 18 | 23 | 23 | 35 | 35 | 55 | 55 | 58 | 58 | 59 | 59 |
| 18 | 18 | 21 | 21 | 23 | 23 | 26 | 26 | 65 | 65 | 58 | 58 | 64 | 64 | 66 | 66 |
| 25 | 25 | 32 | 32 | 35 | 35 | 65 | 65 | 66 | 66 | 66 | 66 | 67 | 67 | 70 | 70 |
| 35 | 35 | 35 | 35 | 55 | 55 | 58 | 58 | 66 | 66 | 68 | 68 | 70 | 70 | 73 | 73 |
| 36 | 36 | 37 | 37 | 58 | 58 | 64 | 64 | 67 | 67 | 70 | 70 | 76 | 76 | 80 | 80 |
| 37 | 37 | 41 | 41 | 59 | 59 | 66 | 66 | 70 | 70 | 73 | 73 | 80 | 80 | 85 | 85 |

| 6  | 6  | 9  | 9  | 13 | 13 | 18 | 18 | 25 | 25 | 35 | 35 | 36 | 36 | 37 | 37 |
|----|----|----|----|----|----|----|----|----|----|----|----|----|----|----|----|
| 13 | 13 | 15 | 15 | 18 | 18 | 23 | 23 | 35 | 35 | 55 | 55 | 58 | 58 | 59 | 59 |
| 25 | 25 | 32 | 32 | 35 | 35 | 65 | 65 | 66 | 66 | 66 | 66 | 67 | 67 | 70 | 70 |
| 36 | 36 | 37 | 37 | 58 | 58 | 64 | 64 | 67 | 67 | 70 | 70 | 76 | 76 | 80 | 80 |

FIG. 12A

| ENCODING TARGET VALUE | BINARY CODE |
|---|---|
| ... | ... |
| -5 | 0001011 |
| -4 | 0001001 |
| -3 | 00111 |
| -2 | 00101 |
| -1 | 011 |
| 0 | 1 |
| 1 | 010 |
| 2 | 00100 |
| 3 | 00110 |
| 4 | 0001000 |
| 5 | 0001010 |
| ... | ... |

FIG. 12B

| ENCODING TARGET VALUE | BINARY CODE |
|---|---|
| ... | ... |
| -5 | 0001011 |
| -4 | 0001001 |
| -3 | 00111 |
| -2 | 0010 |
| -1 | 011 |
| 0 | 11 |
| 1 | 10 |
| 2 | 010 |
| 3 | 00110 |
| 4 | 0001000 |
| 5 | 0001010 |
| ... | ... |

FIG. 13A

| 6 | 9 | 13 | 18 | 25 | 35 | 36 | 37 |
|---|---|----|----|----|----|----|----|
| 7 | 9 | 14 | 19 | 28 | 35 | 36 | 39 |
| 9 | 10 | 15 | 21 | 32 | 35 | 37 | 41 |
| 11 | 12 | 16 | 22 | 33 | 45 | 47 | 50 |
| 13 | 15 | 18 | 23 | 35 | 55 | 58 | 59 |
| 15 | 18 | 20 | 24 | 50 | 56 | 61 | 62 |
| 18 | 21 | 23 | 26 | 65 | 58 | 64 | 66 |
| 21 | 26 | 29 | 45 | 65 | 62 | 65 | 68 |
| 25 | 32 | 35 | 65 | 66 | 66 | 67 | 70 |
| 30 | 33 | 45 | 61 | 66 | 67 | 68 | 71 |
| 35 | 35 | 55 | 58 | 66 | 68 | 70 | 73 |
| 35 | 36 | 56 | 61 | 66 | 69 | 73 | 76 |
| 36 | 37 | 58 | 64 | 67 | 70 | 76 | 80 |
| 36 | 39 | 58 | 65 | 68 | 71 | 78 | 82 |
| 37 | 41 | 59 | 66 | 70 | 73 | 80 | 85 |
| 37 | 41 | 59 | 66 | 70 | 73 | 80 | 85 |

| 6 | 13 | 25 | 36 |
|---|----|----|----|
| 7 | 14 | 28 | 36 |
| 9 | 15 | 32 | 37 |
| 11 | 16 | 33 | 47 |
| 13 | 18 | 35 | 58 |
| 15 | 20 | 50 | 61 |
| 18 | 23 | 65 | 64 |
| 21 | 29 | 65 | 65 |
| 25 | 35 | 66 | 67 |
| 30 | 45 | 66 | 68 |
| 35 | 55 | 66 | 70 |
| 35 | 56 | 66 | 73 |
| 36 | 58 | 67 | 76 |
| 36 | 58 | 67 | 78 |
| 37 | 59 | 70 | 80 |
| 37 | 59 | 70 | 80 |

1202

F I G. 14A

1203

| 6  | 7  | 9  | 11 | 13 | 15 | 18 | 21 | 25 | 30 | 35 | 35 | 36 | 36 | 37 | 37 |
|----|----|----|----|----|----|----|----|----|----|----|----|----|----|----|----|
| 9  | 9  | 10 | 12 | 15 | 18 | 21 | 26 | 32 | 33 | 35 | 36 | 37 | 39 | 41 | 41 |
| 13 | 14 | 15 | 16 | 18 | 20 | 23 | 29 | 35 | 45 | 55 | 56 | 58 | 58 | 59 | 59 |
| 18 | 19 | 21 | 22 | 23 | 24 | 26 | 45 | 65 | 61 | 58 | 61 | 64 | 65 | 66 | 66 |
| 25 | 28 | 32 | 33 | 35 | 50 | 65 | 65 | 66 | 66 | 66 | 66 | 67 | 68 | 70 | 70 |
| 35 | 35 | 35 | 45 | 55 | 56 | 58 | 62 | 66 | 67 | 68 | 69 | 70 | 71 | 73 | 73 |
| 36 | 36 | 37 | 47 | 58 | 61 | 64 | 65 | 67 | 68 | 70 | 73 | 76 | 78 | 80 | 80 |
| 37 | 39 | 41 | 50 | 59 | 62 | 66 | 68 | 70 | 71 | 73 | 76 | 80 | 82 | 85 | 85 |

F I G. 14B

1204

| 6  | 7  | 9  | 11 | 13 | 15 | 18 | 21 | 25 | 30 | 35 | 35 | 36 | 36 | 37 | 37 |
|----|----|----|----|----|----|----|----|----|----|----|----|----|----|----|----|
| 13 | 14 | 15 | 16 | 18 | 20 | 23 | 29 | 35 | 45 | 55 | 56 | 58 | 58 | 59 | 59 |
| 25 | 28 | 32 | 33 | 35 | 50 | 65 | 65 | 66 | 66 | 66 | 66 | 67 | 68 | 70 | 70 |
| 36 | 36 | 37 | 47 | 58 | 61 | 64 | 65 | 67 | 68 | 70 | 73 | 76 | 78 | 80 | 80 |

FIG. 15A

| | | | |
|---|---|---|---|
| 9 | 18 | 35 | 37 |
| 9 | 18 | 35 | 37 |
| 10 | 21 | 35 | 41 |
| 10 | 21 | 35 | 41 |
| 15 | 23 | 55 | 59 |
| 15 | 23 | 55 | 59 |
| 21 | 26 | 58 | 66 |
| 21 | 26 | 58 | 66 |
| 32 | 65 | 66 | 70 |
| 32 | 65 | 66 | 70 |
| 35 | 58 | 68 | 73 |
| 35 | 58 | 68 | 73 |
| 37 | 64 | 70 | 80 |
| 37 | 64 | 70 | 80 |
| 41 | 66 | 73 | 85 |
| 41 | 66 | 73 | 85 |

| | | | | | | | | | | | | | | | |
|---|---|---|---|---|---|---|---|---|---|---|---|---|---|---|---|
| 9 | 9 | 10 | 10 | 15 | 15 | 21 | 21 | 32 | 32 | 35 | 35 | 37 | 37 | 41 | 41 |
| 18 | 18 | 21 | 21 | 23 | 23 | 26 | 26 | 65 | 65 | 58 | 58 | 64 | 64 | 66 | 66 |
| 35 | 35 | 35 | 35 | 55 | 55 | 58 | 58 | 66 | 66 | 68 | 68 | 70 | 70 | 73 | 73 |
| 37 | 37 | 41 | 41 | 59 | 59 | 66 | 66 | 70 | 70 | 73 | 73 | 80 | 80 | 85 | 85 |

IMAGE ENCODING APPARATUS, IMAGE ENCODING METHOD, IMAGE DECODING APPARATUS, IMAGE DECODING METHOD, AND NON-TRANSITORY COMPUTER-READABLE STORAGE MEDIUM

CROSS-REFERENCE TO RELATED APPLICATIONS

This application is a Continuation of U.S. patent application Ser. No. 17/347,379, filed Jun. 14, 2021, which is a Continuation of International Patent Application No. PCT/JP2019/044880, filed Nov. 15, 2019, which claims the benefit of Japanese Patent Application No. 2018-235909, filed Dec. 17, 2018, both of which are hereby incorporated by reference herein in their entirety.

BACKGROUND OF THE INVENTION

Field of the Invention

The present invention relates to an encoding technique and a decoding technique for an image.

Background Art

As an encoding method for moving image compression recording, an HEVC (High Efficiency Video Coding) encoding method (to be referred to as HEVC hereinafter) is known. In the HEVC, to improve the encoding efficiency, a basic block having a size larger than a conventional macro block (16 pixels×16 pixels) is employed. The basic block with the large size is called a CTU (Coding Tree Unit), and its size is 64 pixels×64 pixels at maximum. The CTU is further divided into sub-blocks each of which is a unit to perform prediction or conversion.

In the HEVC, a matrix called a quantization matrix and configured to add a weight, in accordance with a frequency component, to a coefficient (to be referred to as an orthogonal transformation coefficient hereinafter) after orthogonal transformation is used. By further reducing data of a high-frequency component whose degradation is unnoticeable to a human vision, the compression efficiency can be raised while maintaining image quality. PTL 1 discloses a technique of encoding such a quantization matrix.

In recent years, actions have been launched to implement international standardization of an encoding method of a higher efficiency as a replacement of the HEVC. JVET (Joint Video Experts Team) was founded between ISO/IEC and ITU-T, and standardization of a VVC (Versatile Video Coding) encoding method (to be referred to as VVC hereinafter) has been promoted. To improve the encoding efficiency, an intra-prediction/orthogonal transformation method on a rectangular sub-block basis has been examined in addition to a conventional intra-prediction/orthogonal transformation method on a square sub-block basis.

In the VVC as well, introduction of quantization matrices has been examined, like the HEVC. Also, in the VVC, not only square sub-block division but also rectangular sub-block division and a shape of orthogonal transformation corresponding to that have been examined. Since the distribution of orthogonal transformation coefficients changes depending on the shape of orthogonal transformation, optimum quantization matrices are preferably applied in accordance with the shape of orthogonal transformation. However, if quantization matrices are individually defined for all orthogonal transformation shapes, the code amount of quantization matrices unnecessarily increases. The present invention provides a technique of generating a quantization matrix corresponding to rectangular orthogonal transformation.

CITATION LIST

Patent Literature

PTL 1: Japanese Patent Laid-Open No. 2013-38758

SUMMARY OF THE INVENTION

According to the first aspect of the present invention, there is provided an image encoding apparatus for encoding an image, comprising: a generation unit configured to generate, from a first quantization matrix having a size of N×N (N is a positive integer), a second quantization matrix having a size of P×Q (P and Q are positive integers which satisfy $P<N<Q$, and the size of P×Q indicates a size of P in a horizontal direction and a size of Q in a vertical direction); and a quantization unit configured to quantize transformation coefficients in a sub-block having a size corresponding to the size of P×Q using the second quantization matrix.

According to the second aspect of the present invention, there is provided an image encoding apparatus for encoding an image, comprising: a generation unit configured to generate, from a first quantization matrix having a size of N×N (N is a positive integer), a second quantization matrix having a size of P×Q (P and Q are positive integers which satisfy $Q<N<P$, and the size of P×Q indicates a size of P in a horizontal direction and a size of Q in a vertical direction); and a quantization unit configured to quantize transformation coefficients in a sub-block having a size corresponding to the size of P×Q using the second quantization matrix.

According to the third aspect of the present invention, there is provided an image decoding apparatus for decoding an encoded image, comprising: a generation unit configured to generate, from a first quantization matrix having a size of N×N (N is a positive integer), a second quantization matrix having a size of P×Q (P and Q are positive integers which satisfy $P<N<Q$, and the size of P×Q indicates a size of P in a horizontal direction and a size of Q in a vertical direction); and an inverse quantization unit configured to inversely quantize quantized transformation coefficients in a sub-block having a size corresponding to the size of P×Q using the second quantization matrix.

According to the fourth aspect of the present invention, there is provided an image decoding apparatus for decoding an encoded image, comprising: a generation unit configured to generate, from a first quantization matrix having a size of N×N (N is a positive integer), a second quantization matrix having a size of P×Q (P and Q are positive integers which satisfy $Q<N<P$, and the size of P×Q indicates a size of P in a horizontal direction and a size of Q in a vertical direction); and an inverse quantization unit configured to inversely quantize quantized transformation coefficients in a sub-block having a size corresponding to the size of P×Q using the second quantization matrix.

According to the fifth aspect of the present invention, there is provided an image encoding method of encoding an image, comprising: generating, from a first quantization matrix having a size of N×N (N is a positive integer), a second quantization matrix having a size of P×Q (P and Q are positive integers which satisfy $P<N<Q$, and the size of P×Q indicates a size of P in a horizontal direction and a size of Q in a vertical direction); and quantizing transformation coefficients in a sub-block having a size corresponding to the size of P×Q using the second quantization matrix.

According to the sixth aspect of the present invention, there is provided an image encoding method of encoding an image, comprising: generating, from a first quantization matrix having a size of N×N (N is a positive integer), a second quantization matrix having a size of P×Q (P and Q are positive integers which satisfy Q<N<P, and the size of P×Q indicates a size of P in a horizontal direction and a size of Q in a vertical direction); and quantizing transformation coefficients in a sub-block having a size corresponding to the size of P×Q using the second quantization matrix.

According to the seventh aspect of the present invention, there is provided an image decoding method of decoding an encoded image, comprising: generating, from a first quantization matrix having a size of N×N (N is a positive integer), a second quantization matrix having a size of P×Q (P and Q are positive integers which satisfy P<N<Q, and the size of P×Q indicates a size of P in a horizontal direction and a size of Q in a vertical direction); and inversely quantizing quantized transformation coefficients in a sub-block having a size corresponding to the size of P×Q using the second quantization matrix.

According to the eighth aspect of the present invention, there is provided an image decoding method of decoding an encoded image, comprising: generating, from a first quantization matrix having a size of N×N (N is a positive integer), a second quantization matrix having a size of P×Q (P and Q are positive integers which satisfy Q<N<P, and the size of P×Q indicates a size of P in a horizontal direction and a size of Q in a vertical direction); and inversely quantizing quantized transformation coefficients in a sub-block having a size corresponding to the size of P×Q using the second quantization matrix.

According to the ninth aspect of the present invention, there is provided a non-transitory computer-readable storage medium storing a computer program configured to cause a computer to function as: a generation unit configured to generate, from a first quantization matrix having a size of N×N (N is a positive integer), a second quantization matrix having a size of P×Q (P and Q are positive integers which satisfy P<N<Q, and the size of P×Q indicates a size of P in a horizontal direction and a size of Q in a vertical direction); and a quantization unit configured to quantize transformation coefficients in a sub-block having a size corresponding to the size of P×Q using the second quantization matrix.

According to the tenth aspect of the present invention, there is provided a non-transitory computer-readable storage medium storing a computer program configured to cause a computer to function as: a generation unit configured to generate, from a first quantization matrix having a size of N×N (N is a positive integer), a second quantization matrix having a size of P×Q (P and Q are positive integers which satisfy Q<N<P, and the size of P×Q indicates a size of P in a horizontal direction and a size of Q in a vertical direction); and a quantization unit configured to quantize transformation coefficients in a sub-block having a size corresponding to the size of P×Q using the second quantization matrix.

According to the eleventh aspect of the present invention, there is provided a non-transitory computer-readable storage medium storing a computer program configured to cause a computer to function as: a generation unit configured to generate, from a first quantization matrix having a size of N×N (N is a positive integer), a second quantization matrix having a size of P×Q (P and Q are positive integers which satisfy P<N<Q, and the size of P×Q indicates a size of P in a horizontal direction and a size of Q in a vertical direction); and an inverse quantization unit configured to inversely quantize quantized transformation coefficients in a sub-block having a size corresponding to the size of P×Q using the second quantization matrix.

According to the twelfth aspect of the present invention, there is provided a non-transitory computer-readable storage medium storing a computer program configured to cause a computer to function as: a generation unit configured to generate, from a first quantization matrix having a size of N×N (N is a positive integer), a second quantization matrix having a size of P×Q (P and Q are positive integers which satisfy Q<N<P, and the size of P×Q indicates a size of P in a horizontal direction and a size of Q in a vertical direction); and an inverse quantization unit configured to inversely quantize quantized transformation coefficients in a sub-block having a size corresponding to the size of P×Q using the second quantization matrix.

Further features of the present invention will become apparent from the following description of exemplary embodiments with reference to the attached drawings.

BRIEF DESCRIPTION OF THE DRAWINGS

FIG. 4 is a flowchart of decoding processing of a bitstream;

FIG. 5 is a block diagram showing an example of the hardware configuration of a computer apparatus;

FIG. 6B is a view showing an example of the configuration of a bitstream;

FIG. 8 is a view showing an example of an original quantization matrix;

FIG. 9A is a view showing an example of a quantization matrix;

FIG. 9B is a view showing an example of a quantization matrix;

FIG. 10A is a view showing an example of a quantization matrix;

FIG. 10B is a view showing an example of a quantization matrix;

FIG. 12A is a view showing an example of the configuration of an encoding table;

FIG. 12B is a view showing an example of the configuration of an encoding tabl;

FIG. 13A is a view showing an example of a quantization matrix;

FIG. 13B is a view showing an example of a quantization matrix;

FIG. 14A is a view showing an example of a quantization matrix;

FIG. 14B is a view showing an example of a quantization matrix;

FIG. 15A is a view showing an example of a quantization matrix; and

FIG. 15B is a view showing an example of a quantization matrix.

DESCRIPTION OF THE EMBODIMENTS

Figure 1:
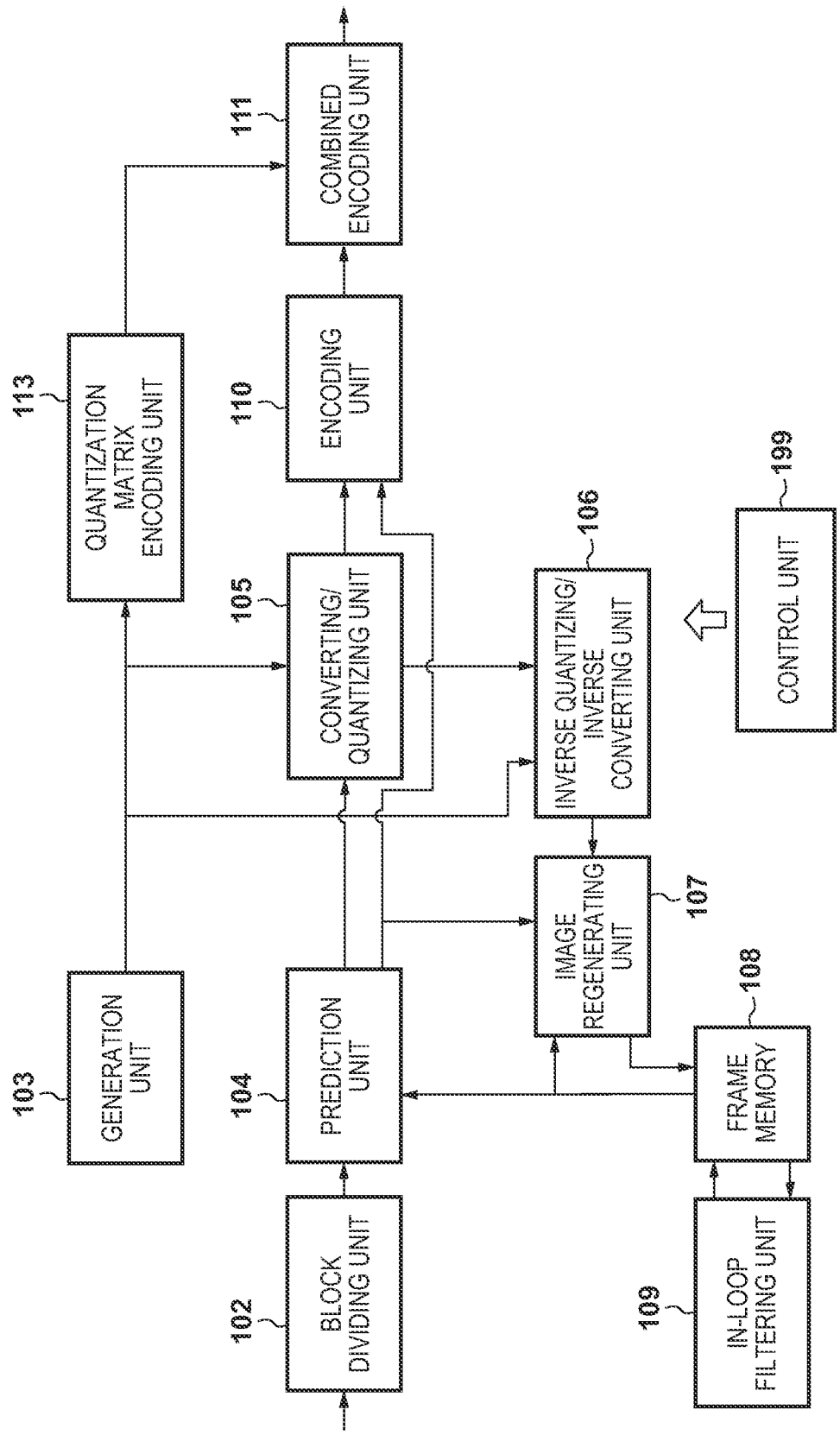
FIG. 1 is a block diagram showing an example of the functional configuration of an image encoding apparatus.

The embodiments of the present invention will now be described with reference to the accompanying drawings. Note that an embodiment to be described below shows an example when the present invention is implemented in detail, and is one of detailed embodiments of a configuration described in claims.

First Embodiment

An example of the functional configuration of an image encoding apparatus according to this embodiment will be described first with reference to the block diagram of FIG. 1. A control unit 199 controls the operation of the entire image encoding apparatus. A block dividing unit 102 divides an input image (the image of each frame of a moving image, or a still image) into a plurality of basic blocks and outputs each basic block (divided image).

A generation unit 103 uses a quantization matrix having a size of N×N (a quantization matrix having N elements in the row direction and N elements in the column direction) as an original quantization matrix. The generation unit 103 generates, from the original quantization matrix, a quantization matrix having a size (P×Q) corresponding to the pixels of a sub-block serving as an orthogonal transformation unit. Here, P and Q are positive integers, and P≠Q.

A prediction unit 104 divides each basic block into a plurality of sub-blocks (divided images). For each sub-block, the prediction unit 104 generates a predicted image by performing intra-prediction that is prediction in a frame or inter-prediction that is prediction between frames, and obtains the difference between the input image and the predicted image as a prediction error. Also, the prediction unit 104 generates, as prediction information, information representing how the basic block is divided into sub-blocks, the prediction mode, and information necessary for prediction such as a motion vector.

A converting/quantizing unit 105 performs orthogonal transformation of the prediction error of each sub-block, thereby obtaining transformation coefficients of each sub-block. For each sub-block, the converting/quantizing unit 105 acquires a quantization matrix according to the size of the sub-block from the generation unit 103 and quantizes the transformation coefficients in the sub-block using the quantization matrix, thereby generating quantized coefficients of the sub-block.

An inverse quantizing/inverse converting unit 106 generates transformation coefficients by inversely quantizing the quantized coefficients of each sub-block generated by the converting/quantizing unit 105 using the quantization matrix used to quantize the sub-block, and performs inverse orthogonal transformation of the transformation coefficients, thereby generating a prediction error.

An image regenerating unit 107 generates, based on the prediction information generated by the prediction unit 104, a predicted image from the encoded image data stored in a frame memory 108, and regenerates an image from the predicted image and the prediction error generated by the inverse quantizing/inverse converting unit 106. The image regenerating unit 107 stores the regenerated image in the frame memory 108. The image data stored in the frame memory 108 is image data to be referred to by the prediction unit 104 when performing prediction for the image of the current frame or the next frame.

An in-loop filtering unit 109 performs in-loop filtering processing such as deblocking filtering or sample adaptive offsetting for the image stored in the frame memory 108.

An encoding unit 110 encodes the quantized coefficients generated by the converting/quantizing unit 105 and the prediction information generated by the prediction unit 104, thereby generating encoded data. A quantization matrix encoding unit 113 encodes the original quantization matrix, thereby generating encoded data.

A combined encoding unit 111 generates header encoded data using the encoded data generated by the quantization matrix encoding unit 113, generates a bitstream including the header encoded data and the encoded data generated by the encoding unit 110, and outputs the bitstream.

The operation of the image encoding apparatus according to this embodiment will be described next. Note that in this embodiment, to facilitate the description, intra-prediction encoding processing of an input image will be described. However, the present invention is not limited to this and can also be applied to inter-prediction encoding processing of an input image. Also, in this embodiment, the size of the quantization matrix of a basic block is assumed to be a size including 16×16 elements. However, the size of the basic block is not limited to 16×16. In this embodiment, in the above-described encoding processing, a quantization matrix needs to be prepared at the start of processing by the converting/quantizing unit 105 or the inverse quantizing/inverse converting unit 106.

First, generation and encoding of a quantization matrix will be described. An example of an original quantization matrix is shown in FIG. 8. An original quantization matrix 800 shown in FIG. 8 is an example of a quantization matrix corresponding to 8×8 orthogonal transformation coefficients. A method of deciding the element values of the elements that form the original quantization matrix is not particularly limited. For example, predetermined initial values may be used as the element values of the elements that form the original quantization matrix, or the element values of the elements may individually be set. The original quantization matrix may be generated in accordance with the characteristic of an image.

In this embodiment, the generation unit 103 generates, from the original quantization matrix 800, a quantization matrix corresponding to another size of orthogonal transformation (that is, the size of a divided sub-block). In this embodiment, the generation unit 103 generates, from the original quantization matrix 800 shown in FIG. 8, quantization matrices 901, 902, 1001, and 1002 having rectangular shapes shown in FIGS. 9A, 9B, 10A, and 10B, respectively. Note that in the quantization matrices 902 and 1002 shown in FIGS. 9B and 10B, if a quantization matrix generated when the size of the original quantization matrix is N×N has a size of P×Q, P and Q are positive integers which satisfy P<N<Q, or Q<N<P.

The quantization matrix 901 shown in FIG. 9A is a quantization matrix corresponding to 8×16 orthogonal transformation coefficients. In the quantization matrix 901, an element at a position (row, column)=(m, n) in the original quantization matrix 800 is arranged at a position (row, column)=(2m, n) and a position (row, column)=(2m+1, n) in the quantization matrix 901 (in the quantization matrix). Here, m and n are integers of 0 or more.

The quantization matrix 1001 shown in FIG. 10A is a quantization matrix corresponding to 16×8 orthogonal transformation coefficients. In the quantization matrix 1001, an element at a position (row, column)=(m, n) in the original quantization matrix 800 is arranged at a position (row, column)=(m, 2n) and a position (row, column)=(m, 2n+1) in the quantization matrix 1001.

The quantization matrix 902 shown in FIG. 9B is a quantization matrix corresponding to 4×16 orthogonal transformation coefficients. In the quantization matrix 902, an element at a position (row, column)=(m, 2n) in the original quantization matrix 800 is arranged at a position (row, column)=(2m, n) and a position (row, column)=(2m+1, n) in the quantization matrix 902.

The quantization matrix 1002 shown in FIG. 10B is a quantization matrix corresponding to 16×4 orthogonal transformation coefficients. In the quantization matrix 1002, an element at a position (row, column)=(2m, n) in the original quantization matrix 800 is arranged at a position (row, column)=(m, 2n) and a position (row, column)=(m, 2n+1) in the quantization matrix 1002.

As described above, in this embodiment, the generation unit 103 generates the quantization matrices 901, 902, 1001, and 1002 from the original quantization matrix 800 and holds these. Regardless of the size of a divided rectangular sub-block, which is 8×16, 16×8, 16×4, or 4×16, a quantization matrix of a corresponding size is already generated. It is therefore possible to perform quantization/inverse quantization of the sub-block. In particular, the quantization matrices 902 and 1002 shown in FIGS. 9B and 10B are generated by enlarging the original quantization matrix in one direction and reducing it in the other direction (by thinning out the original quantization matrix in every other row/column). This can decrease the data amount of the original quantization matrix as compared to a case in which a quantization matrix is generated by simply reducing the original quantization matrix and suppress degradation of image quality as compared a case in which a quantization matrix is generated by simply enlarging the original quantization matrix. Hence, a result with good balance of rate-distortion can be expected.

The generation unit 103 holds the original quantization matrix 800 and the quantization matrices 901, 902, 1001, and 1002 generated in this way in a two-dimensional shape. Note that it is also possible to hold a plurality of quantization matrices for orthogonal transformation of the same size depending on the prediction method to be described later, for example, whether to use intra-prediction or inter-prediction, or depending on whether an encoding target is a luminance block or a color difference block. In a quantization matrix, generally, to implement quantization processing according to the visual characteristic of a human, as shown in FIGS. 8, 9A, 9B, 10A, and 10B, elements in a low-frequency portion corresponding to the upper left portion of the quantization matrix are small, and elements in a high-frequency portion corresponding to the lower right portion are large.

The quantization matrix encoding unit 113 acquires a quantization matrix held in a two-dimensional shape from the generation unit 103, calculates differences by scanning the elements, and generates a one-dimensional matrix (difference matrix) in which the differences are one-dimensionally arranged in the calculation order. The quantization matrix encoding unit 113 encodes the generated difference matrix, thereby generating encoded data.

In this embodiment, the quantization matrices shown in FIGS. 9A, 9B, 10A, and 10B can be generated from the original quantization matrix 800 in the above-described way, the quantization matrix encoding unit 113 encodes only the original quantization matrix 800. More specifically, according to a scanning method of scanning the elements in an order indicated by arrows in FIG. 11A, the quantization matrix encoding unit 113 calculates the difference between each element and an immediately preceding element in the original quantization matrix 800 in the scanning order. For example, the original quantization matrix 800 is scanned by diagonal scanning shown in FIG. 11A. Next to the first element "6" located at the upper left corner, an element "9" located immediately under that is scanned, and the difference "+3" is calculated. To encode the first element ("6" in this embodiment) of the original quantization matrix 800, the difference from a predetermined initial value (for example, "8") is calculated. However, the value is not limited to this, and the difference from an arbitrary value may be used, or the value of the first element itself may be used as the difference.

Figure 11A:
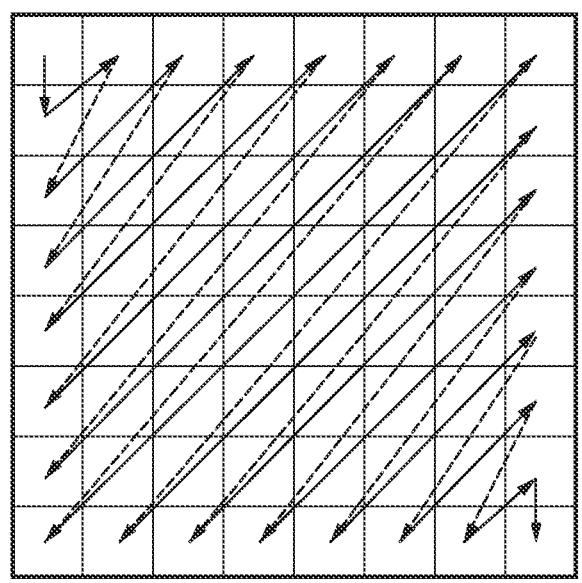
FIG. 11A is a view showing a scanning method.
Figure 11B:
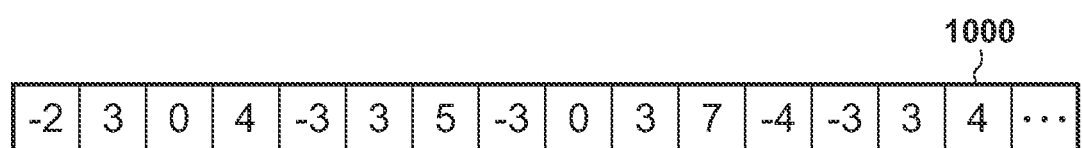
FIG. 11B is a view showing a difference matrix 1000.

As described above, in this embodiment, the quantization matrix encoding unit 113 generates a difference matrix 1000 shown in FIG. 11B from the original quantization matrix 800 using the scanning method shown in FIG. 11A. The quantization matrix encoding unit 113 then encodes the difference matrix 1000, thereby generating encoded data. In this embodiment, encoding is performed using an encoding table shown in FIG. 12A. However, the encoding table is not limited to this, and, for example, an encoding table shown in FIG. 12B may be used.

In this embodiment, since only the original quantization matrix 800 is encoded in the original quantization matrix 800 and the quantization matrices 901, 902, 1001, and 1002, the code amount of quantization matrices with rectangular shapes can be decreased. In addition, when encoding is performed using only the scanning method of one type shown in FIG. 11A independently of the shape of the quantization matrix to be generated, a table used to implement the scanning method shown in FIG. 11A can be limited to only one table, and the memory can be saved.

The combined encoding unit 111 encodes header information necessary for decoding of an image (to be described later) and combines the header information and the encoded data of the quantization matrix generated by the quantization matrix encoding unit 113.

Encoding of an input image will be described next. The block dividing unit 102 divides the input image into a plurality of basic blocks and outputs the divided basic blocks. The prediction unit 104 decides a dividing method of dividing a basic block into a plurality of sub-blocks. FIGS. 7A to 7F show examples of the dividing method of dividing a basic block into a plurality of sub-blocks.

Figure 7A:
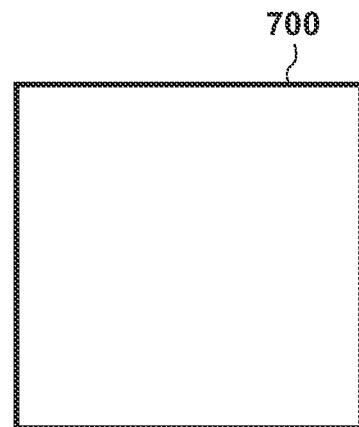
FIG. 7A is a view showing an example of a dividing method.
Figure 7B:
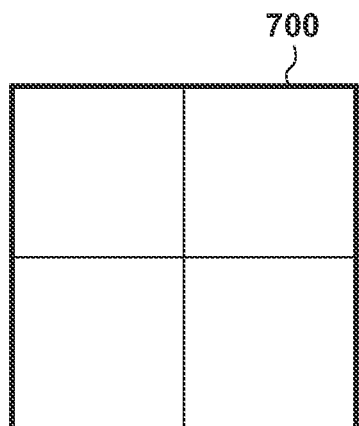
FIG. 7B is a view showing an example of a dividing method.

FIG. 7B shows a sub-block dividing method (quadtree division). That is, FIG. 7B shows a dividing method (division pattern) of dividing a basic block 700 into two equal parts in the horizontal direction and in the vertical direction, thereby dividing the basic block 700 into four sub-blocks (the size of one sub-block is the size of 8×8 pixels). On the other hand, FIGS. 7C to 7F show sub-block dividing methods of dividing the basic block 700 into rectangular sub-blocks.

Figure 7C:
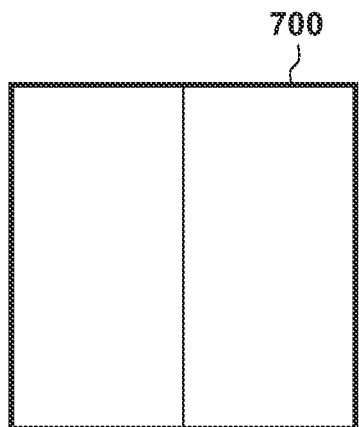
FIG. 7C is a view showing an example of a dividing method.

FIG. 7C shows a dividing method of dividing the basic block 700 into two equal parts in the vertical direction, thereby dividing the basic block 700 into two vertically long sub-blocks (the size of one sub-block is the size of 8×16 pixels).

Figure 7D:
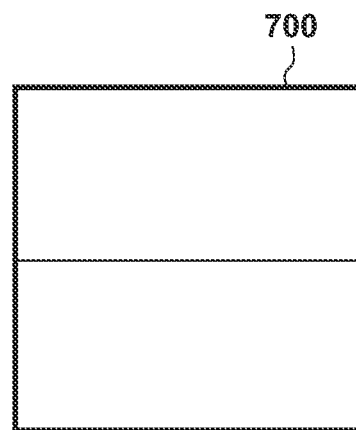
FIG. 7D is a view showing an example of a dividing method.

FIG. 7D shows a dividing method of dividing the basic block 700 into two equal parts in the horizontal direction, thereby dividing the basic block 700 into two horizontally long sub-blocks (the size of one sub-block is the size of 16×8 pixels).

Figure 7E:
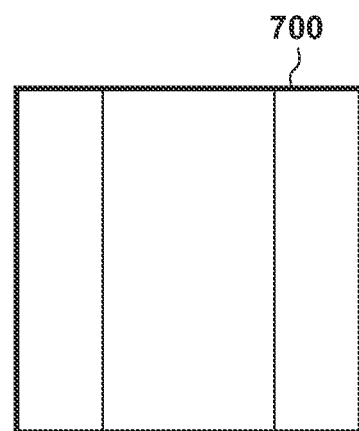
FIG. 7E is a view showing an example of a dividing method.

FIG. 7E shows three vertically long sub-blocks (a sub-block corresponding to 4×16 pixels, a sub-block corresponding to 8×16 pixels, and a sub-block corresponding to 4×16 pixels from the left side) obtained by dividing the basic block 700 in the vertical direction (ternary tree division).

Figure 7F:
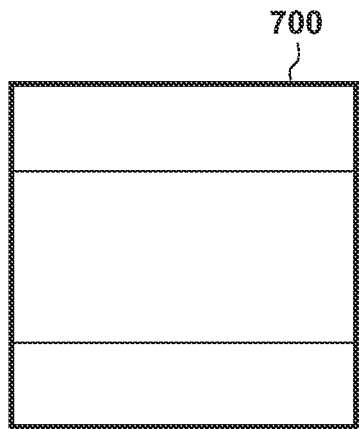
FIG. 7F is a view showing an example of a dividing method.

FIG. 7F shows three horizontally long sub-blocks (a sub-block corresponding to 16×4 pixels, a sub-block corresponding to 16×8 pixels, and a sub-block corresponding to 16×4 pixels from the left side) obtained by dividing the basic block 700 in the horizontal direction (ternary tree division).

In this embodiment, one of the dividing methods (division patterns) shown in FIGS. 7B to 7F is used. However, the methods are not limited to those shown in FIGS. 7B to 7F. Note that as shown in FIG. 7A, the basic block 700 may be used as a sub-block without being divided.

The prediction unit 104 decides, for example, an intra-prediction mode such as horizontal prediction or vertical prediction on a sub-block basis. On a basic block basis, the prediction unit 104 divides the basic block into a plurality of sub-blocks in accordance with the decided dividing method. For each sub-block, the prediction unit 104 generates a predicted image by performing prediction in accordance with the decided intra-prediction mode using an image in the frame memory 108, and obtains the difference between the input image and the predicted image as a prediction error. Also, the prediction unit 104 generates, as prediction information, information representing the sub-block dividing method (division pattern), the intra-prediction mode, and information necessary for prediction such as a motion vector.

The converting/quantizing unit 105 performs orthogonal transformation of the prediction error of each sub-block, thereby generating transformation coefficients of each sub-block. For each sub-block, the converting/quantizing unit 105 acquires a quantization matrix according to the size of the sub-block from the generation unit 103 and quantizes the transformation coefficients in the sub-block using the quantization matrix, thereby generating quantized coefficients of the sub-block.

To quantize the transformation coefficients of a sub-block of 8 pixels×8 pixels, the converting/quantizing unit 105 acquires the original quantization matrix 800 from the generation unit 103, and quantizes the transformation coefficients using the acquired original quantization matrix 800.

To quantize the transformation coefficients of a sub-block of 8 pixels×16 pixels, the converting/quantizing unit 105 acquires the quantization matrix 901 from the generation unit 103, and quantizes the transformation coefficients using the acquired quantization matrix 901.

To quantize the transformation coefficients of a sub-block of 16 pixels×8 pixels, the converting/quantizing unit 105 acquires the quantization matrix 1001 from the generation unit 103, and quantizes the transformation coefficients using the acquired quantization matrix 1001.

To quantize the transformation coefficients of a sub-block of 4 pixels×16 pixels, the converting/quantizing unit 105 acquires the quantization matrix 902 from the generation unit 103, and quantizes the transformation coefficients using the acquired quantization matrix 902.

To quantize the transformation coefficients of a sub-block of 16 pixels×4 pixels, the converting/quantizing unit 105 acquires the quantization matrix 1002 from the generation unit 103, and quantizes the transformation coefficients using the acquired quantization matrix 1002.

The inverse quantizing/inverse converting unit 106 generates transformation coefficients by inversely quantizing the quantized coefficients of each sub-block generated by the converting/quantizing unit 105 using the quantization matrix used to quantize the sub-block, and performs inverse orthogonal transformation of the transformation coefficients, thereby generating a prediction error.

The image regenerating unit 107 generates, based on the prediction information generated by the prediction unit 104, a predicted image from the processed image stored in the frame memory 108, and regenerates an image from the predicted image and the prediction error generated by the inverse quantizing/inverse converting unit 106. The image regenerating unit 107 stores the regenerated image in the frame memory 108.

The in-loop filtering unit 109 performs in-loop filtering processing such as deblocking filtering or sample adaptive offsetting for the image stored in the frame memory 108.

The encoding unit 110 entropy-encodes the quantized coefficients (quantized transformation coefficients) generated by the converting/quantizing unit 105 and the prediction information generated by the prediction unit 104, thereby generating encoded data. The method of entropy encoding is not limited to a specific method, and Golomb coding, arithmetic coding, Huffman coding, or the like can be used.

The combined encoding unit 111 generates header encoded data using the encoded data generated by the quantization matrix encoding unit 113, and generates a bitstream by multiplying the encoded data generated by the encoding unit 110 and the header encoded data. The combined encoding unit 111 then outputs the generated bitstream.

Figure 6A:
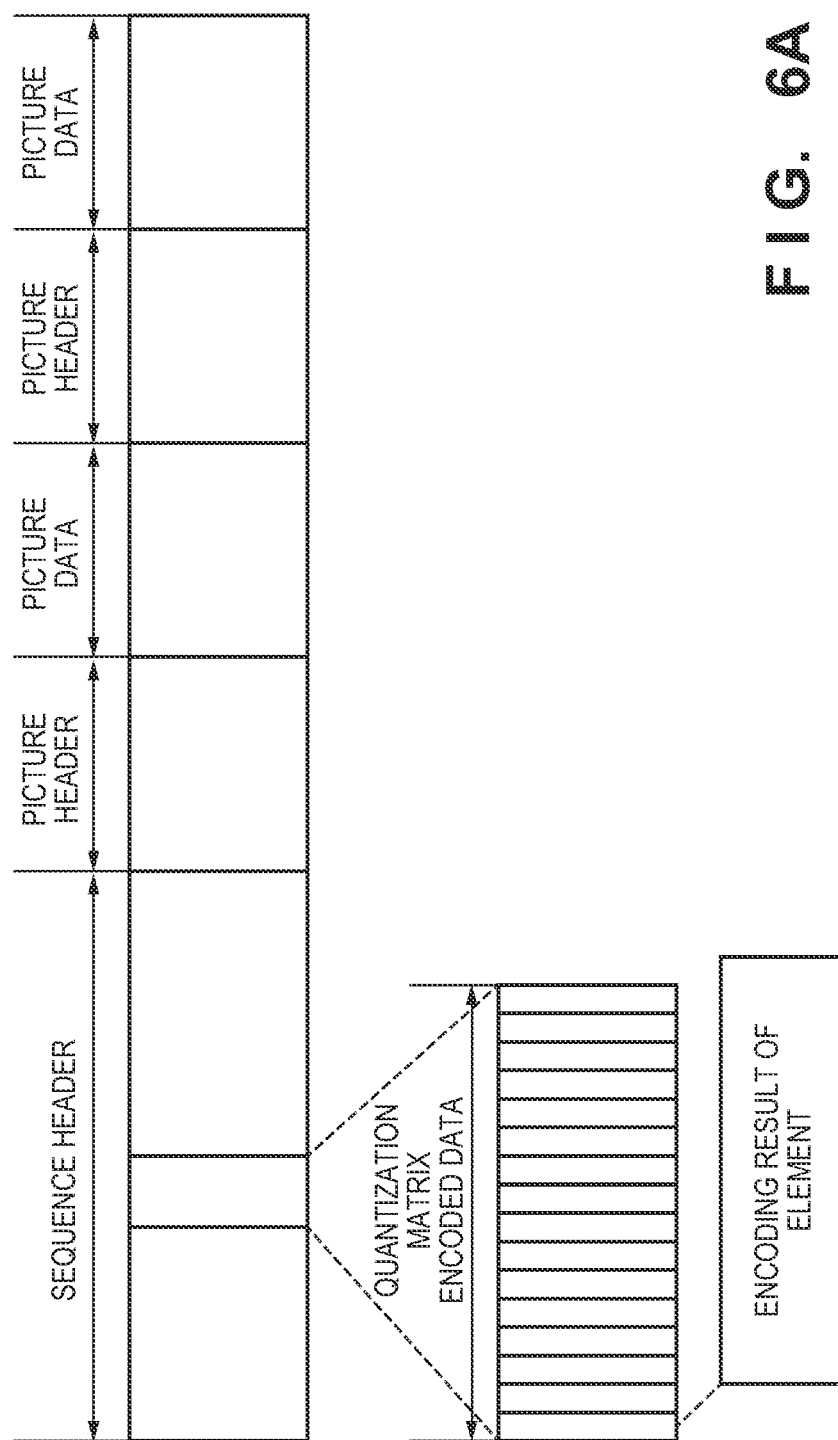
FIG. 6A is a view showing an example of the configuration of a bitstream.

FIG. 6A shows an example of the configuration of a bitstream. A sequence header includes encoded data corresponding to the original quantization matrix 800, which is formed by the encoding result of each element. However, the position to encode is not limited to this, and the data may be encoded in a picture header or another header. If the quantization matrix is to be changed in one sequence, the quantization matrix can be updated by newly encoding it. At this time, all quantization matrices may be rewritten, or some of them may be changed by designating the conversion block size of a quantization matrix to be rewritten.

Figure 3:
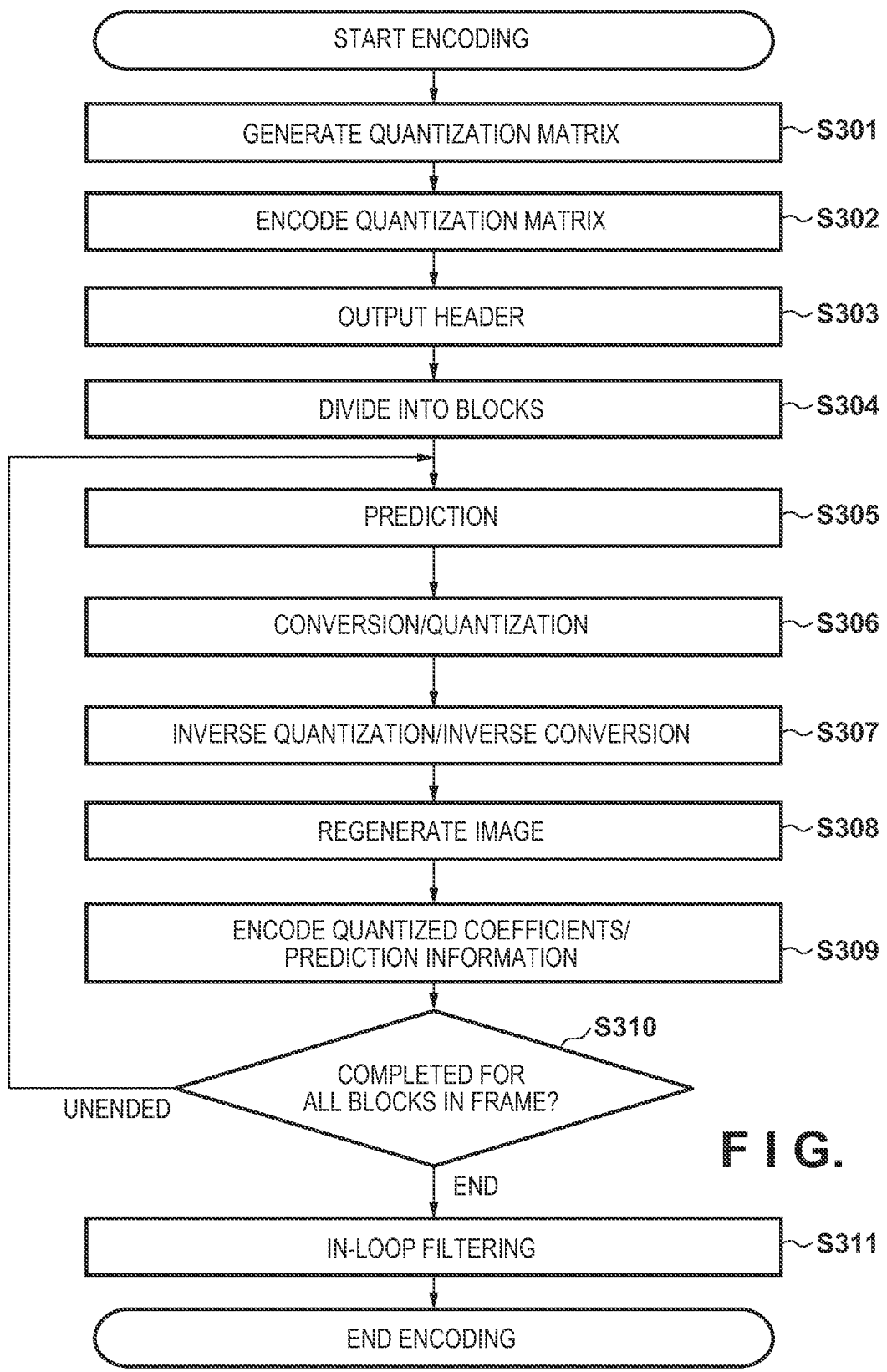
FIG. 3 is a flowchart of encoding processing of an input image and a quantization matrix.

Encoding processing of an input image and a quantization matrix by the above-described image encoding apparatus will be described with reference to the flowchart of FIG. 3. In step S301, the generation unit 103 generates the original quantization matrix 800, and generates the quantization matrices 901, 902, 1001, and 1002 from the original quantization matrix 800.

In step S302, the quantization matrix encoding unit 113 calculates a difference by scanning the elements of the original quantization matrix 800 in accordance with the scanning method shown in FIG. 11A, and generates, as the difference matrix 1000, a one-dimensional matrix in which the differences are one-dimensionally arranged in the calculation order. The quantization matrix encoding unit 113 encodes the calculated difference matrix 1000, thereby generating encoded data.

In step S303, the combined encoding unit 111 encodes header information necessary for encoding of the image, and combines the header information and the encoded data of the quantization matrix generated by the quantization matrix encoding unit 113.

In step S304, the block dividing unit 102 divides an input image into a plurality of basic blocks.

In step S305, the prediction unit 104 selects, as a selected basic block, an unselected one of the basic blocks divided in step S304. The prediction unit 104 decides a sub-block dividing method (division pattern), and divides the selected basic block into a plurality of sub-blocks in accordance with the decided sub-block dividing method. Also, the prediction unit 104 decides the intra-prediction mode on a sub-block basis. For each sub-block, the prediction unit 104 generates a predicted image by performing prediction in accordance with the decided intra-prediction mode using an image in the frame memory 108, and obtains the difference between the input image and the predicted image as a prediction error. Also, the prediction unit 104 generates, as prediction information, information representing the sub-block dividing method, the intra-prediction mode, and information necessary for prediction such as a motion vector.

In step S306, the converting/quantizing unit 105 performs orthogonal transformation of the prediction error of each sub-block, thereby generating transformation coefficients of each sub-block. For each sub-block, the converting/quantizing unit 105 quantizes the transformation coefficients of the sub-block using a quantization matrix according to the size of the sub-block in the quantization matrices generated in step S301, thereby generating quantized coefficients of the sub-block.

In step S307, the inverse quantizing/inverse converting unit 106 generates transformation coefficients by inversely quantizing the quantized coefficients of each sub-block generated in step S306 using the quantization matrix used to quantize the sub-block. Then, the inverse quantizing/inverse converting unit 106 performs inverse orthogonal transformation of the generated transformation coefficients, thereby generating a prediction error.

In step S308, the image regenerating unit 107 generates, based on the prediction information generated by the prediction unit 104, a predicted image from the processed image stored in the frame memory 108. Then, the image regenerating unit 107 regenerates an image from the predicted image and the prediction error generated by the inverse quantizing/inverse converting unit 106. The image regenerating unit 107 stores the regenerated image in the frame memory 108.

In step S309, the encoding unit 110 entropy-encodes the quantized coefficients generated by the converting/quantizing unit 105 and the prediction information generated by the prediction unit 104, thereby generating encoded data. The combined encoding unit 111 generates header encoded data using the encoded data generated by the quantization matrix encoding unit 113, and multiplexes the header encoded data and the encoded data generated by the encoding unit 110, thereby generating a bitstream.

In step S310, the control unit 199 determines whether all basic blocks are encoded. As the result of the determination, if all basic blocks are encoded, the process advances to step S311. If an unencoded basic block remains, the process returns to step S305.

In step S311, the in-loop filtering unit 109 performs in-loop filtering processing such as deblocking filtering or sample adaptive offsetting for the image stored in the frame memory 108.

According to the above-described embodiment, particularly, a plurality of quantization matrices are generated from one quantization matrix in step S301, and only one quantization matrix is encoded in step S302, thereby decreasing the code amount of the quantization matrices. As a result, since the data amount of the whole generated bitstream is decreased, the compression efficiency can be improved. Also, particularly, the quantization matrices shown in FIGS. 9B and 10B are generated by enlarging the original quantization matrix in one direction and reducing it in the other direction. This can decrease the data amount of the original quantization matrix as compared to a case in which a quantization matrix is generated by simply reducing the original quantization matrix and suppress degradation of image quality as compared a case in which a quantization matrix is generated by simply enlarging the original quantization matrix. Hence, a result with good balance of rate-distortion can be expected.

Note that in this embodiment, a plurality of quantization matrices are generated from one quantization matrix. However, whether to generate a quantization matrix from another quantization matrix or whether to encode each element may be selected on a quantization matrix basis, and an identifier representing the selection result may be encoded in the header. For example, information representing whether to generate each element of a quantization matrix from another quantization matrix or whether to individually encode the elements may be encoded in a header as a quantization matrix encoding method information code, thereby generating a bitstream shown in FIG. 6B. This makes it possible to selectively generate a bitstream that gives priority to image quality control according to the size of a sub-block or a bitstream in which the code amount of a quantization matrix is smaller.

Also, in this embodiment, the method of generating the quantization matrices 901, 902, 1001, and 1002 from the original quantization matrix 800 has been described. However, the method of generating rectangular quantization matrices from a square quantization matrix is not limited to the method described in the first embodiment.

For example, a method of generating, from the original quantization matrix 800, quantization matrices 1201 to 1204 having rectangular shapes shown in FIGS. 13A and 13B and FIGS. 14A and 14B may be employed.

The quantization matrix 1201 shown in FIG. 13A is a quantization matrix corresponding to 8×16 orthogonal transformation coefficients. The rows of the original quantization matrix 800 are arranged in the even-numbered rows of the quantization matrix 1201. In each odd-numbered row of the quantization matrix 1201, elements interpolated from even-numbered rows that sandwich the odd-numbered row are arrayed. For example, an element "14" at a position (row, column)=(1, 2) in the quantization matrix 1201 is obtained as a value interpolated from an element "13" in the even-numbered row immediately above and an element "15" in the even-numbered row immediately below.

The quantization matrix 1202 shown in FIG. 13B is a quantization matrix corresponding to 4×16 orthogonal transformation coefficients. The quantization matrix 1202 is formed only by the even-numbered columns of the quantization matrix 1201 generated from the original quantization matrix 800, as described above, excluding the odd-numbered columns.

The quantization matrix 1203 shown in FIG. 14A is a quantization matrix corresponding to 16×8 orthogonal transformation coefficients. The columns of the original quantization matrix 800 are arranged in the even-numbered columns of the quantization matrix 1203. In each odd-numbered column of the quantization matrix 1203, elements interpolated from even-numbered columns that sandwich the odd-numbered column are arrayed. For example, an element "14" at a position (row, column)=(2, 1) in the quantization matrix 1203 is obtained as a value interpolated from an element "13" in the column adjacent on the left side and an element "15" in the column adjacent on the right side.

The quantization matrix 1204 shown in FIG. 14B is a quantization matrix corresponding to 16×4 orthogonal transformation coefficients. The quantization matrix 1204 is formed only by the even-numbered rows of the quantization matrix 1203 generated from the original quantization matrix 800, as described above, excluding the odd-numbered rows.

As described above, the original quantization matrix 800 is enlarged or reduced in the row direction or column direction, thereby generating another quantization matrix. By this generation method, finer quantization control according to a frequency component can be performed, and as a result, image quality can be made high.

Also, in this embodiment, when generating the quantization matrix 902 or the quantization matrix 1002, the elements of the even-numbered columns or even-numbered rows of the original quantization matrix 800 are used. However, the quantization matrices may be generated using the elements of the odd-numbered columns or odd-numbered rows of the original quantization matrix 800.

For example, a quantization matrix 1601 corresponding to 4×16 orthogonal transformation coefficients as shown in FIG. 15A or a quantization matrix 1602 corresponding to 16×4 orthogonal transformation coefficients as shown in FIG. 15B may be generated.

In the quantization matrix 1601, an element at a position (row, column)=(m, 2n+1) in the original quantization matrix 800 is arranged at a position (row, column)=(2m, n) and a position (row, column)=(2m+1, n) in the quantization matrix 1601.

In the quantization matrix 1602, an element at a position (row, column)=(2m+1, n) in the original quantization matrix 800 is arranged at a position (row, column)=(m, 2n) and a position (row, column)=(m, 2n+1) in the quantization matrix 1602.

As described above, a plurality of quantization matrices having the same shape and different elements can be generated from one original quantization matrix. A flag representing selection of even-numbered columns or odd-numbered columns of the original quantization matrix or a flag representing selection of even-numbered rows or odd-numbered rows may be encoded.

Furthermore, a configuration for switching a plurality of quantization matrices thus generated and having the same shape in accordance with the type of an orthogonal transformation method to be used may be employed. For example, if orthogonal transformation is based on discrete cosine transformation, the quantization matrix 902 or the quantization matrix 1002 is generated. If orthogonal transformation is based on discrete sine transformation, the quantization matrix 1601 or the quantization matrix 1602 is generated. It is therefore possible to use a quantization matrix according to the characteristic of orthogonal transformation to be used.

If the size of orthogonal transformation to be used is limited, generation or encoding of some quantization matrices may be omitted. For example, if orthogonal transformation for the pixels of a sub-block with a size of 4×16 pixels or a sub-block with a size of 16×4 pixels is not performed, generation of the quantization matrix 902 or the quantization matrix 1002 may be omitted. If orthogonal transformation for the pixels of sub-blocks with sizes of 8×8 pixels, 16×8 pixels, 8×16 pixels, 16×4 pixels, and 4×16 pixels is not performed, encoding of the original quantization matrix 800 itself may be omitted. In this case, generation of the quantization matrices 901, 902, 1001, and 1002 is also omitted, as a matter of course. However, even if orthogonal transformation for the pixels of a sub-block with a size of 8×8 pixels is not used, if orthogonal transformation for the pixels of a sub-block having at least one of the sizes of 16×8 pixels, 8×16 pixels, 16×4 pixels, and 4×16 pixels is performed, the original quantization matrix 800 is encoded, and a quantization matrix corresponding to the orthogonal transformation is generated. Accordingly, only quantization matrices to be used are encoded/generated, and an extra code amount in a case in which no quantization matrix is used can be decreased.

Second Embodiment

In this embodiment, an image decoding apparatus that decodes an input image encoded by the image encoding apparatus according to the first embodiment will be described. Differences from the first embodiment will be described below, and the rest is the same as in the first embodiment unless otherwise specified below. An example of the functional configuration of the image decoding apparatus according to this embodiment will be described with reference to the block diagram of FIG. 2.

A control unit 299 controls the operation of the entire image decoding apparatus. A demultiplexing/decoding unit 202 acquires a bitstream generated by the image encoding apparatus, demultiplexes information concerning decoding processing and encoded data concerning coefficients from the bitstream, and decodes encoded data existing in the header of the bitstream. In this embodiment, the demultiplexing/decoding unit 202 demultiplexes encoded data of a quantization matrix from the bitstream. That is, the demultiplexing/decoding unit 202 performs an operation reverse to that of the above-described combined encoding unit 111.

A quantization matrix decoding unit 209 acquires the encoded data of the quantization matrix demultiplexed from the bitstream by the demultiplexing/decoding unit 202, and decodes the acquired encoded data, thereby generating a quantization matrix.

A decoding unit 203 decodes the encoded data demultiplexed from the bitstream by the demultiplexing/decoding unit 202, thereby acquiring quantized coefficients and prediction information. An inverse quantizing/inverse converting unit 204 performs an operation similar to that of the inverse quantizing/inverse converting unit 106 provided in the above-described image encoding apparatus. The inverse quantizing/inverse converting unit 204 acquires transformation coefficients by inversely quantizing the quantized coefficients based on the quantization matrix decoded by the quantization matrix decoding unit 209, and performs inverse orthogonal transformation for the transformation coefficients, thereby acquiring a prediction error.

An image regenerating unit 205 generates a predicted image by referring to an image stored in a frame memory 206 based on the prediction information decoded by the decoding unit 203. The image regenerating unit 205 generates a regenerated image using the generated predicted image and the prediction error obtained by the inverse quantizing/inverse converting unit 204, and stores the generated regenerated image in the frame memory 206.

An in-loop filtering unit 207 performs in-loop filtering processing such as deblocking filtering for the regenerated image stored in the frame memory 206. The regenerated image stored in the frame memory 206 is appropriately output by the control unit 299. The output destination of the regenerated image is not limited to a specific output destination. For example, the regenerated image may be displayed on a display screen of a display device such as a display, or the regenerated image may be output to a projection apparatus such as a projector.

The operation (bitstream decoding processing) of the image decoding apparatus having the above-described configuration will be described next. In this embodiment, the bitstream input to the demultiplexing/decoding unit 202 is a bitstream of each frame of a moving image. However, it may be a bitstream of a still image. In this embodiment, to facilitate the description, only intra-prediction decoding processing will be described. However, the present invention is not limited to this, and can also be applied to inter-prediction decoding processing.

The demultiplexing/decoding unit 202 acquires a bitstream of one frame generated by the image encoding apparatus, demultiplexes information concerning decoding processing and encoded data concerning coefficients from the bitstream, and decodes encoded data existing in the header of the bitstream. The demultiplexing/decoding unit 202 extracts quantization matrix encoded data (encoded data of a quantization matrix) from the sequence header of the bitstream shown in FIG. 6A, and sends the quantization matrix encoded data to the quantization matrix decoding unit 209. Also, the demultiplexing/decoding unit 202 outputs encoded data of each basic block of picture data to the decoding unit 203.

The quantization matrix decoding unit 209 decodes the encoded data of the quantization matrix demultiplexed from the bitstream by the demultiplexing/decoding unit 202, thereby generating a one-dimensional difference matrix. To decode the encoded data of the quantization matrix, an encoding table used on the encoding side (in the first embodiment, of the encoding table shown in FIG. 12A and the encoding table shown in FIG. 12B, the encoding table used on the encoding side) is used. The quantization matrix decoding unit 209 inversely scans the generated one-dimensional difference matrix, thereby generating a two-dimensional quantization matrix (original quantization matrix). This processing is processing reverse to that of the quantization matrix encoding unit 113 described in the first embodiment. That is, in this embodiment, an original quantization matrix 800 shown in FIG. 8 is generated from a difference matrix 1000 shown in FIG. 11B using a scanning method shown in FIG. 11A. The quantization matrix decoding unit 209 generates quantization matrices 901, 902, 1001, and 1002 from the generated original quantization matrix 800, as in the first embodiment. At this time, the above-described flag representing selection of even-numbered columns or odd-numbered columns of the original quantization matrix or the flag representing selection of even-numbered rows or odd-numbered rows is decoded as needed. Generation from the original quantization matrix is performed in accordance with the flag.

The decoding unit 203 decodes the encoded data demultiplexed from the bitstream by the demultiplexing/decoding unit 202, thereby acquiring quantized coefficients and prediction information. The inverse quantizing/inverse converting unit 204 selects, from the original quantization matrix 800 and the quantization matrices 901, 902, 1001, and 1002 generated by the quantization matrix decoding unit 209, a quantization matrix according to the size of a sub-block to be decoded based on information representing a sub-block dividing method pattern, which is one of the pieces of prediction information. The inverse quantizing/inverse converting unit 204 acquires transformation coefficients by inversely quantizing the quantized coefficients of the sub-block of the decoding target using the selected quantization matrix, and performs inverse orthogonal transformation for the transformation coefficients, thereby acquiring a prediction error.

The image regenerating unit 205 generates a predicted image by referring to an image stored in the frame memory 206 based on the prediction information decoded by the decoding unit 203. The image regenerating unit 205 generates a regenerated image using the generated predicted image and the prediction error obtained by the inverse quantizing/inverse converting unit 204, and stores the generated regenerated image in the frame memory 206. The in-loop filtering unit 207 performs in-loop filtering processing such as deblocking filtering for the regenerated image stored in the frame memory 206.

Decoding processing of a bitstream corresponding to one frame by the image decoding apparatus described above will be described with reference to the flowchart of FIG. 4. In step S401, the demultiplexing/decoding unit 202 acquires a bitstream corresponding to one frame generated by the image encoding apparatus. The demultiplexing/decoding unit 202 then demultiplexes information concerning decoding processing and encoded data concerning coefficients from the bitstream, and decodes encoded data existing in the header of the bitstream.

In step S402, the quantization matrix decoding unit 209 decodes the encoded data of the quantization matrix demultiplexed from the bitstream by the demultiplexing/decoding unit 202, thereby generating a one-dimensional difference matrix. Then, the quantization matrix decoding unit 209 inversely scans the generated one-dimensional difference matrix, thereby generating the two-dimensional original quantization matrix 800. The quantization matrix decoding unit 209 generates the quantization matrices 901, 902, 1001, and 1002 from the generated original quantization matrix 800, as in the first embodiment. Particularly, the quantization matrices 902 and 1002 shown in FIGS. 9B and 10B are generated by enlarging the original quantization matrix in one direction and reducing it in the other direction. This can decrease the data amount of the original quantization matrix as compared to a case in which a quantization matrix is generated by simply reducing the original quantization matrix and suppress degradation of image quality as compared a case in which a quantization matrix is generated by simply enlarging the original quantization matrix. Hence, a result with good balance of rate-distortion can be expected.

Note that in the quantization matrices 902 and 1002 shown in FIGS. 9B and 10B, if a quantization matrix generated when the size of the original quantization matrix is N×N has a size of P×Q, P and Q are positive integers which satisfy P<N<Q, or Q<N<P. Note that when dividing a block into sub-blocks, the sub-blocks may adaptively be generated in accordance with division information representing which type of pattern should be used in the patterns shown in FIGS. 7B to 7F.

The processes of steps S403 to S406 are performed based on each basic block. In step S403, the decoding unit 203 decodes the encoded data demultiplexed from the bitstream by the demultiplexing/decoding unit 202, thereby acquiring quantized coefficients and prediction information.

In step S404, the inverse quantizing/inverse converting unit 204 selects, from the quantization matrices generated by the quantization matrix decoding unit 209, a quantization matrix according to the size and shape of a sub-block of a decoding target. The inverse quantizing/inverse converting unit 204 acquires transformation coefficients by inversely quantizing the quantized coefficients of the sub-block of the decoding target using the selected quantization matrix, and performs inverse orthogonal transformation for the transformation coefficients, thereby acquiring a prediction error.

In step S405, the image regenerating unit 205 generates a predicted image by referring to an image stored in the frame memory 206 based on the prediction information decoded by the decoding unit 203. The image regenerating unit 205 generates a regenerated image using the generated predicted image and the prediction error obtained by the inverse quantizing/inverse converting unit 204, and stores the generated regenerated image in the frame memory 206.

In step S406, the control unit 299 determines whether decoding of all basic blocks included in the bitstream is completed. As the result of the determination, if decoding of all basic blocks included in the bitstream is completed, the process advances to step S407. On the other hand, if a sub-block whose decoding is not completed yet remains in all basic blocks included in the bitstream, the processing from step S403 is repeated for the sub-block whose decoding is not completed yet.

In step S407, the in-loop filtering unit 207 performs in-loop filtering processing such as deblocking filtering for the regenerated image stored in the frame memory 206.

According to the above-described embodiment, since only the original quantization matrix generated in the first embodiment is encoded, a bitstream in which the code amount of a quantization matrix is decreased can be decoded. In addition, since the element scanning method used to decode the quantization matrix is limited to one type shown in FIG. 11A, a table used to implement the scanning method shown in FIG. 11A can be limited to only one table, and the memory can be saved.

Note that in this embodiment, a plurality of quantization matrices are generated from one quantization matrix. However, on a quantization matrix basis, an identifier for selecting whether to generate a quantization matrix derivatively from another quantization matrix or whether to decode each element encoded independently of the other quantization matrix may be decoded from the header. For example, information representing whether to generate the elements of a quantization matrix from another quantization matrix or individually decode the elements may be decoded as a quantization matrix encoding method information code from the header of the bitstream shown in FIG. 6B. This makes it possible to decode a bitstream for which whether to give priority to image quality control according to the size of a sub-block or whether to make the code amount of a quantization matrix smaller is selected.

Also, in this embodiment, a method of generating the quantization matrices 901, 902, 1001, and 1002 from the original quantization matrix 800 has been described. However, as on the image encoding apparatus side, the method of generating a quantization matrix having a rectangular shape from a quantization matrix having a square shape is not limited to the method described in the first embodiment. For example, a method of generating, from the original quantization matrix 800, quantization matrices 1201 to 1204 shown in FIGS. 13A and 13B and FIGS. 14A and 14B may be employed. By this method, finer quantization control according to a frequency component can be performed, and as a result, a bitstream with higher image quality can be decoded.

Also, if a certain quantization matrix size is not used because of a limitation on the size of orthogonal transformation to be used, decoding or generation of the quantization matrix that is not used may be omitted. For example, if orthogonal transformation for a sub-block with a pixel size of 4×16 pixels or 16×4 pixels is not performed, generation of the quantization matrix 902 or the quantization matrix 1002 may be omitted. If orthogonal transformation for sub-blocks with pixel sizes of 8×8 pixels, 16×8 pixels, 8×16 pixels, 16×4 pixels, and 4×16 pixels is not performed, decoding of the original quantization matrix 800 itself may be omitted. In this case, generation of the quantization matrices 901, 902, 1001, and 1002 is also omitted, as a matter of course. However, even if orthogonal transformation for a sub-block with a pixel size of 8×8 pixels is not performed, if orthogonal transformation is performed for a sub-block having at least one of the sizes of 16×8 pixels, 8×16 pixels, 16×4 pixels, and 4×16 pixels is performed, the original quantization matrix 800 is decoded, and a quantization matrix corresponding to the orthogonal transformation is generated. Accordingly, only quantization matrices to be used are decoded/generated, and a bitstream in which an extra code amount in a case in which no quantization matrix is used is decreased can be decoded.

Note that in this embodiment, the image decoding apparatus has been described as an apparatus different from the image encoding apparatus according to the first embodiment. However, the image decoding apparatus and the image encoding apparatus according to the first embodiment may be combined into one apparatus. In this case, this apparatus can encode an input image and decode the encoded input image as needed.

Third Embodiment

Figure 2:
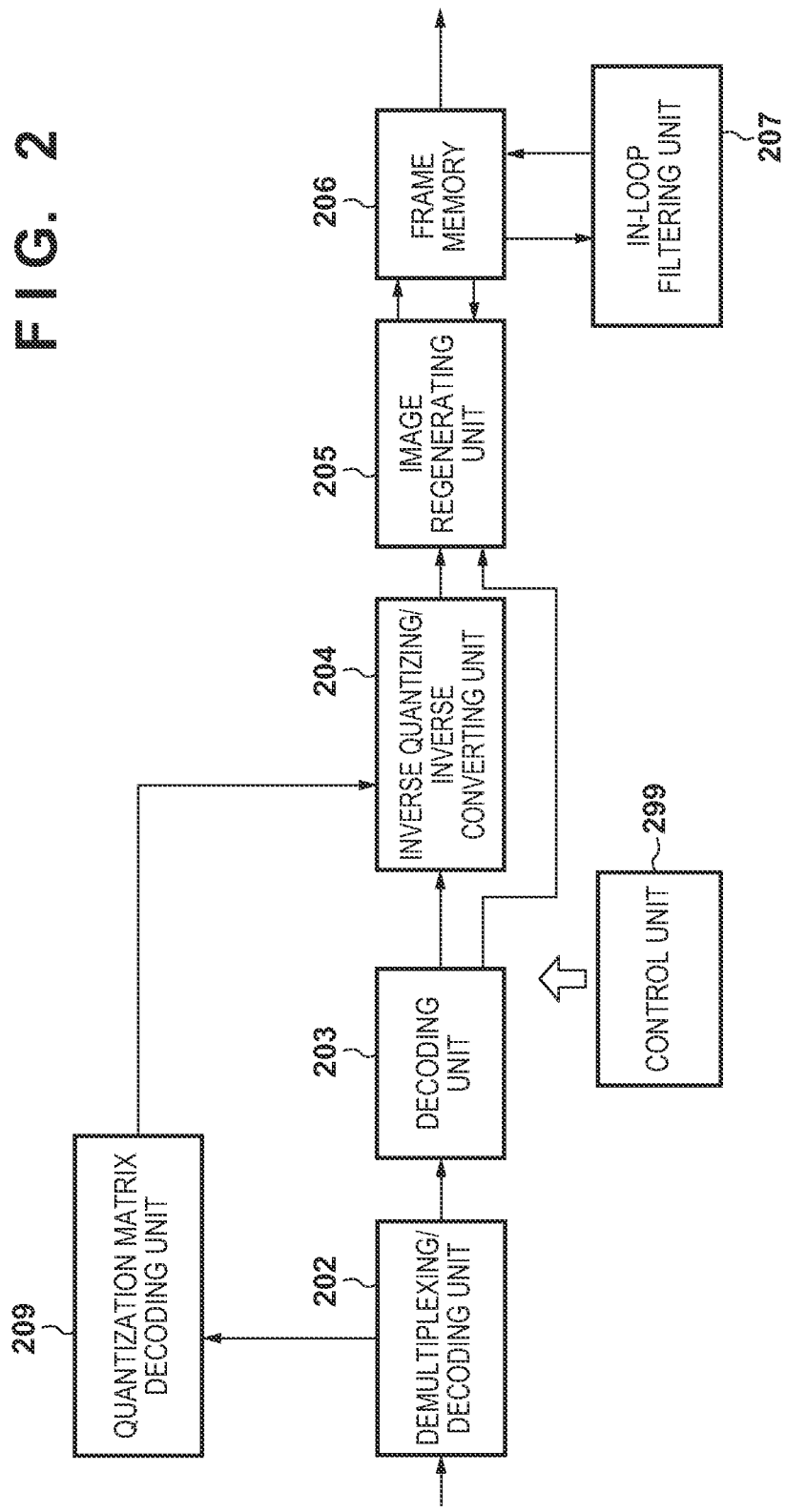
FIG. 2 is a block diagram showing an example of the functional configuration of an image decoding apparatus.

All the functional units shown in FIGS. 1 and 2 may be implemented by hardware, and some may be implemented by software (computer programs). In this case, a computer apparatus including the frame memory 108 or the frame memory 206 as a memory device and capable of executing the computer programs can be applied to the above-described image encoding apparatus or image decoding apparatus. An example of the hardware configuration of the computer apparatus applicable to the above-described image encoding apparatus or image decoding apparatus will be described with reference to the block diagram of FIG. 5.

A CPU 501 executes various kinds of processing using computer programs and data stored in a RAM 502 or a ROM 503. Accordingly, the CPU 501 performs operation control of the entire computer apparatus and executes or controls the processing described above as processing to be executed by the above-described image encoding apparatus or image decoding apparatus.

The RAM 502 has an area for storing computer programs and data loaded from the ROM 503 or an external storage device 506 and data (for example, the above-described data of a moving image or a still image) received from the outside via an I/F (interface) 507. The RAM 502 also has a work area used by the CPU 501 to execute various kinds of processing. The RAM 502 can thus appropriately provide various kinds of areas. The setting data and the activation program of the computer apparatus are stored in the ROM 503.

An operation unit 504 is a user interface such as a keyboard, a mouse, or a touch panel. By operating the operation unit 504, a user can input various kinds of instructions to the CPU 501.

A display unit 505 is formed by a liquid crystal screen or a touch panel screen and can display a result of processing by the CPU 501 as an image or characters. For example, a regenerated image decoded by the above-described image decoding apparatus may be displayed on the display unit 505. Note that the display unit 505 may be a projection apparatus such as a projector that projects an image or characters.

The external storage device 506 is a mass information storage device such as a hard disk drive. An OS (Operating System) and computer programs and data used to cause the CPU 501 to execute or control various kinds of processing described above as processing to be executed by the above-described image encoding apparatus or image decoding apparatus are stored in the external storage device 506. The computer programs stored in the external storage device 506 include a computer program used to cause the CPU 501 to implement the functions of functional units other than the above-described frame memory 108 and frame memory 206. Also, the data stored in the external storage device 506 includes various kinds of information necessary for encoding or decoding, such as the encoding table shown in FIG. 12A or 12B.

The computer programs and data stored in the external storage device 506 are appropriately loaded into the RAM 502 under the control of the CPU 501 and processed by the CPU 501. Note that the above-described frame memory 108 or frame memory 206 can be implemented by a memory device such as the RAM 502, the ROM 503, or the external storage device 506.

The I/F 507 functions as an interface configured to perform data communication with an external device. For example, a moving image or a still image can be acquired from an external server apparatus or image capturing apparatus to the RAM 502 or the external storage device 506 via the I/F 507.

The CPU 501, the RAM 502, the ROM 503, the operation unit 504, the display unit 505, the external storage device 506, and the I/F 507 are connected to a bus 508. Note that the configuration shown in FIG. 5 is merely an example of the hardware configuration of the computer apparatus applicable to the above-described image encoding apparatus or image decoding apparatus, and various changes/modifications can be made.

Fourth Embodiment

The numerical values used in the above description are merely used to make a detailed description, and are not intended to limit the above-described embodiments to the used numerical values. For example, the size of a quantization matrix and elements of a quantization matrix are not limited to the above-described numerical values.

Some or all of the above-described embodiments may appropriately be used in combination. Alternatively, some or all of the above-described embodiments may selectively be used.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

According to the configuration of the present invention, it is possible to provide a technique of generating a quantization matrix corresponding to rectangular orthogonal transformation.

The invention claimed is:

1. An image encoding apparatus for encoding an image, comprising:
a generation unit configured to generate, from a first quantization matrix having a size of 8×8, a second quantization matrix having a size of 4×16 (the size of 4×16 indicates a size of 4 in a horizontal direction and a size of 16 in a vertical direction), wherein the first quantization matrix has a r-th row and a r-th column (r is an integer which satisfies $0 \leq r \leq 7$), and the second quantization matrix has a p-th row and a q-th column (p is an integer which satisfies $0 \leq p \leq 15$, and q is an integer which satisfies $0 \leq q \leq 3$); and
a quantization unit configured to quantize transformation coefficients in a block having a size corresponding to the size of 4×16 using the second quantization matrix,
wherein the generation unit generates the second quantization matrix at least (a) by decreasing elements of the first quantization matrix having the size of 8×8 in a horizontal direction without increasing elements of the first quantization matrix having the size of 8×8 in the horizontal direction when generating the second quantization matrix from the first quantization matrix so that all elements at a 1-th column, a 3-th column, a 5-th column, and a 7-th column of the first quantization matrix are removed, and (b) by increasing elements of the first quantization matrix having the size of 8×8 in a vertical direction so that an element at an m-th row and a 2n-th column in the first quantization matrix is arranged as an element at a 2m-th row and an n-th column in the second quantization matrix and an element at a (2m+1)-th row and the n-th column in the second quantization matrix, wherein m and n are integers of 0 or more, and
wherein the generation unit is capable of generating a third quantization matrix having a size of 16×8 (the size of 16×8 indicates a size of 16 in a horizontal direction and a size of 8 in a vertical direction) from the first quantization matrix.

2. An image decoding apparatus for decoding an encoded image, comprising:
a generation unit configured to generate, from a first quantization matrix having a size of 8×8, a second quantization matrix having a size of 4×16 (the size of 4×16 indicates a size of 4 in a horizontal direction and a size of 16 in a vertical direction), wherein the first quantization matrix has a r-th row and a r-th column (r is an integer which satisfies 0≤r≤7), and the second quantization matrix has a p-th row and a q-th column (p is an integer which satisfies 0≤p≤15, and q is an integer which satisfies 0≤q≤3); and
an inverse quantization unit configured to inversely quantize quantized transformation coefficients in a block having a size corresponding to the size of 4×16 using the second quantization matrix,
wherein the generation unit generates the second quantization matrix at least (a) by decreasing elements of the first quantization matrix having the size of 8×8 in a horizontal direction without increasing elements of the first quantization matrix having the size of 8×8 in the horizontal direction when generating the second quantization matrix from the first quantization matrix so that all elements at a 1-th column, a 3-th column, a 5-th column, and a 7-th column of the first quantization matrix are removed, and (b) by increasing elements of the first quantization matrix having the size of 8×8 in a vertical direction so that an element at an m-th row and a 2n-th column in the first quantization matrix is arranged as an element at a 2m-th row and an n-th column in the second quantization matrix and an element at a (2m+1)-th row and the n-th column in the second quantization matrix, wherein m and n are integers of 0 or more, and
wherein the generation unit is capable of generating a third quantization matrix having a size of 16×8 (the size of 16×8 indicates a size of 16 in a horizontal direction and a size of 8 in a vertical direction) from the first quantization matrix.

3. An image encoding method of encoding an image, comprising:
generating, from a first quantization matrix having a size of 8×8, a second quantization matrix having a size of 4×16 (the size of 4×16 indicates a size of 4 in a horizontal direction and a size of 16 in a vertical direction), wherein the first quantization matrix has a r-th row and a r-th column (r is an integer which satisfies 0≤r≤7), and the second quantization matrix has a p-th row and a q-th column (p is an integer which satisfies 0≤p≤15, and q is an integer which satisfies 0≤q≤3); and
quantizing transformation coefficients in a block having a size corresponding to the size of 4×16 using the second quantization matrix,
wherein the second quantization matrix is generated at least (a) by decreasing elements of the first quantization matrix having the size of 8×8 in a horizontal direction without increasing elements of the first quantization matrix having the size of 8×8 in the horizontal direction when generating the second quantization matrix from the first quantization matrix so that all elements at a 1-th column, a 3-th column, a 5-th column, and a 7-th column of the first quantization matrix are removed, and (b) by increasing elements of the first quantization matrix having the size of 8×8 in a vertical direction so that an element at an m-th row and a 2n-th column in the first quantization matrix is arranged as an element at a 2m-th row and an n-th column in the second quantization matrix and an element at a (2m+1)-th row and the n-th column in the second quantization matrix, wherein m and n are integers of 0 or more, and
wherein a third quantization matrix having a size of 16×8 (the size of 16×8 indicates a size of 16 in a horizontal direction and a size of 8 in a vertical direction) is capable of being generated from the first quantization matrix.

4. An image decoding method of decoding an encoded image, comprising:
generating, from a first quantization matrix having a size of 8×8, a second quantization matrix having a size of 4×16 (the size of 4×16 indicates a size of 4 in a horizontal direction and a size of 16 in a vertical direction), wherein the first quantization matrix has a r-th row and a r-th column (r is an integer which satisfies 0≤r≤7), and the second quantization matrix has a p-th row and a q-th column (p is an integer which satisfies 0≤p≤15, and q is an integer which satisfies 0≤q≤3); and
inversely quantizing quantized transformation coefficients in a block having a size corresponding to the size of 4×16 using the second quantization matrix,
wherein the second quantization matrix is generated at least (a) by decreasing elements of the first quantization matrix having the size of 8×8 in a horizontal direction without increasing elements of the first quantization matrix having the size of 8×8 in the horizontal direction when generating the second quantization matrix from the first quantization matrix so that all elements at a 1-th column, a 3-th column, a 5-th column, and a 7-th column of the first quantization matrix are removed, and (b) by increasing elements of the first quantization matrix having the size of 8×8 in a vertical direction so that an element at an m-th row and a 2n-th column in the first quantization matrix is arranged as an element at a 2m-th row and an n-th column in the second quantization matrix and an element at a (2m+1)-th row and the n-th column in the second quantization matrix, wherein m and n are integers of 0 or more, and wherein a third quantization matrix having a size of 16×8 (the size of 16×8 indicates a size of 16 in a horizontal direction and a size of 8 in a vertical direction) is capable of being generated from the first quantization matrix.

5. A non-transitory computer-readable storage medium storing a computer program for causing a computer to:
generate, from a first quantization matrix having a size of 8×8, a second quantization matrix having a size of 4×16 (the size of 4×16 indicates a size of 4 in a horizontal direction and a size of 16 in a vertical direction), wherein the first quantization matrix has a r-th row and a r-th column (r is an integer which satisfies 0≤r≤7), and the second quantization matrix has a p-th row and a q-th column (p is an integer which satisfies 0≤p≤15, and q is an integer which satisfies 0≤q≤3); and
quantize transformation coefficients in a block having a size corresponding to the size of 4×16 using the second quantization matrix,
wherein the second quantization matrix is generated at least (a) by decreasing elements of the first quantization matrix having the size of 8×8 in a horizontal direction without increasing elements of the first quantization matrix having the size of 8×8 in the horizontal direction when generating the second quantization matrix from the first quantization matrix so that all elements at a 1-th column, a 3-th column, a 5-th column, and a 7-th column of the first quantization matrix are removed, and (b) by increasing elements of the first quantization matrix having the size of 8×8 in a vertical direction so that an element at an m-th row and a 2n-th column in the first quantization matrix is arranged as an element at a 2m-th row and an n-th column in the second quantization matrix and an element at a (2m+1)-th row and the n-th column in the second quantization matrix, wherein m and n are integers of 0 or more, and wherein a third quantization matrix having a size of 16×8 (the size of 16×8 indicates a size of 16 in a horizontal direction and a size of 8 in a vertical direction) is capable of being generated from the first quantization matrix.

6. A non-transitory computer-readable storage medium storing a computer program for causing a computer to:

generate, from a first quantization matrix having a size of 8×8, a second quantization matrix having a size of 4×16 (the size of 4×16 indicates a size of 4 in a horizontal direction and a size of 16 in a vertical direction), wherein the first quantization matrix has a r-th row and a r-th column (r is an integer which satisfies $0 \le r \le 7$), and the second quantization matrix has a p-th row and a q-th column (p is an integer which satisfies $0 \le p \le 15$, and q is an integer which satisfies $0 \le q \le 3$); and inversely quantize quantized transformation coefficients in a block having a size corresponding to the size of 4×16 using the second quantization matrix, wherein the second quantization matrix is generated at least (a) by decreasing elements of the first quantization matrix having the size of 8×8 in a horizontal direction without increasing elements of the first quantization matrix having the size of 8×8 in the horizontal direction when generating the second quantization matrix from the first quantization matrix so that all elements at a 1-th column, a 3-th column, a 5-th column, and a 7-th column of the first quantization matrix are removed, and (b) by increasing elements of the first quantization matrix having the size of 8×8 in a vertical direction so that an element at an m-th row and a 2n-th column in the first quantization matrix is arranged as an element at a 2m-th row and an n-th column in the second quantization matrix and an element at a (2m+1)-th row and the n-th column in the second quantization matrix, wherein m and n are integers of 0 or more, and wherein a third quantization matrix having a size of 16×8 (the size of 16×8 indicates a size of 16 in a horizontal direction and a size of 8 in a vertical direction) is capable of being generated from the first quantization matrix.

* * * * *